(12) United States Patent  
Yamasaki

(10) Patent No.: US 7,409,141 B2  
(45) Date of Patent: Aug. 5, 2008

(54) DATA PROCESSING

(75) Inventor: Kenji Yamasaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 922 days.

(21) Appl. No.: 10/648,091

(22) Filed: Aug. 26, 2003

(65) Prior Publication Data

US 2004/0120689 A1   Jun. 24, 2004

(30) Foreign Application Priority Data

Aug. 27, 2002 (JP) ............................. 2002-247162
Jul. 24, 2003  (JP) ............................. 2003-278914

(51) Int. Cl.
*H04N 5/91* (2006.01)
(52) U.S. Cl. ..................................................... 386/68
(58) Field of Classification Search .................. 386/46, 386/83, 68; 369/30.05, 53.37, 89
See application file for complete search history.

(56) References Cited

U.S. PATENT DOCUMENTS 5,771,329 A * 6/1998 Yun ............................. 386/46
6,195,726 B1 * 2/2001 Hogan ......................... 711/112
6,973,012 B2 * 12/2005 Kondo ...................... 369/30.05

FOREIGN PATENT DOCUMENTS

GB   2 320 389    6/1998
JP     9-83952    3/1997

* cited by examiner

*Primary Examiner*—Thai Tran
*Assistant Examiner*—Tat Chi Chio
(74) *Attorney, Agent, or Firm*—Frommer Lawrence & Haug LLP; William S. Frommer

(57) ABSTRACT

A buffer memory continues storing AV data having time code added thereto, which data is supplied from a time code adding unit. A drive reads the AV data stored in the buffer memory and records the AV data onto an optical disc. When an instruction to pause recording is inputted, the drive stops recording the AV data onto the optical disc, while the buffer memory continues storing newest AV data. When an instruction to resume recording is inputted within a predetermined time, the drive reads the AV data after the time of input of the pause instruction from the buffer memory, and records the AV data onto the optical disc. Thus the AV data picked up during the pause period is recorded on the optical disc. Consequently, the possibility of missing taking desired video (audio) can be reduced.

15 Claims, 16 Drawing Sheets

DATA PROCESSING

BACKGROUND OF THE INVENTION

The present invention relates to data processing, and particularly to data processing that ensures more the recording of video (audio) desired by a user.

Conventionally, a video recording apparatus such as a camcorder (trademark), for example, starts recording video and audio onto a recording medium when an operation for giving an instruction to start recording is inputted from a user, and ends the recording of video and audio onto the recording medium when an operation for giving an instruction to end recording is inputted from the user. When an operation for giving an instruction to pause recording is inputted during the recording of video and audio, the video recording apparatus stops recording the video and audio onto the recording medium, and when an operation for canceling the pause is thereafter inputted, the video recording apparatus resumes recording the video and audio onto the recording medium.

However, the conventional video recording apparatus has a problem in that when a scene occurs which the user desires to take immediately after the video recording apparatus stops recording video and audio according to a pause instruction, the video recording apparatus may be unable to record the video desired by the user. The user often misses taking a desired scene especially when taking a subject such as a child, a pet or the like, whose movement is difficult to predict. Also, a video recording apparatus for professional use as used for news, for example, may be unable to record video desired by a cameraperson when an event or an accident occurs immediately after the cameraperson pauses video recording by the video recoding apparatus.

SUMMARY OF THE INVENTION

The present invention has been made in view of the above, and it is accordingly an object of the present invention to ensure more the recording of necessary video (audio).

According to the present invention, there is provided a data processing apparatus including: a recorder for recording content data onto a recording medium; and a controller for controlling the recorder such that when, after first timing in which user instruction information indicating a first instruction to pause or stop recording of the content data is received from a user during recording of the content data onto the recording medium, user instruction information indicating a second instruction to resume recording the content data is received in third timing before second timing that is timing a preset period after the first timing, the content data corresponding to a period from the first timing to the third timing is recorded on the recording medium so as to be continuous with the content data before the first timing.

DETAILED DESCRIPTION OF PREFERRED EMBODIMENTS

Figure 1:
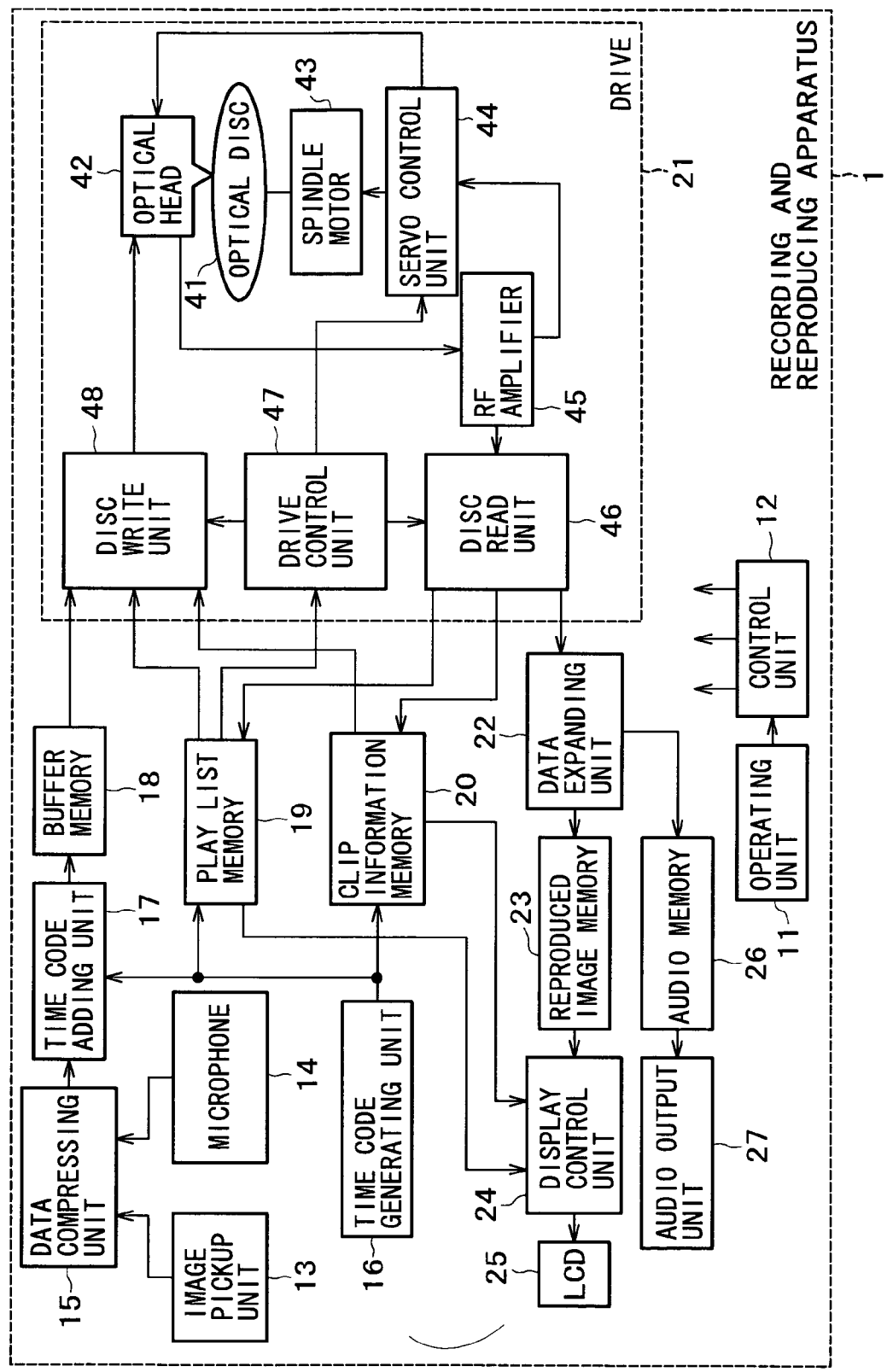
FIG. 1 is a block diagram showing an example of configuration of a recording and reproducing apparatus to which the present invention is applied.

FIG. 1 shows an example of configuration of a recording and reproducing apparatus 1 as a combination camera and video recording apparatus to which a data processing apparatus according to the present invention is applied.

An operating unit 11 comprises a plurality of buttons and the like. When receiving an operation input from a user, the operating unit 11 supplies operation information corresponding to the input operation to a control unit 12.

The control unit 12 controls each part of the recording and reproducing apparatus 1 according to a preset program and operation information (user instruction information) supplied (received) from the operating unit 11 to perform processing such as recording processing, reproduction processing, editing processing and the like, which will be described later.

An image pickup unit 13 comprises an image pickup device such as a CCD (Charge Coupled Device), for example. A microphone 14 collects sound from surroundings. A data compressing unit 15 generates compressed data by compressing a signal of picked-up images picked up and supplied from the image pickup unit 13 and an audio signal supplied from the microphone 14 by a system such as MPEG (Moving Picture Experts Group) 1, MPEG 2, MPEG 4, JPEG (Joint Photographic Experts Group), or JPEG 2000, for example, and then supplies the compressed data to a time code adding unit 17. Data such as moving image data and audio data included in the compressed data will also be referred to as content data. The content data may be non-compressed data rather than compressed data.

A time code generating unit 16 generates time code as time information under control of the control unit 12, and then supplies the time code to the time code adding unit 17, a play list memory 19, and a clip information memory 20. The time code adding unit 17 adds a time code to the compressed data supplied from the data compressing unit 15, and then supplies the compressed data having the time code added thereto to a buffer memory 18. The buffer memory 18 stores the compressed data having the time code added thereto which data is supplied from the time code adding unit 17, and supplies the compressed data to a disc write unit 48 as required. Incidentally, as will be described later in detail, after storing compressed data up to a limit of storage capacity, the buffer memory 18 overwrites oldest compressed data of the compressed data already stored therein with newest compressed data supplied from the time code adding unit 17.

The play list memory 19 stores, as play list information, a time code of a recording start point obtained from the time code generating unit 16 in timing in which an operation for starting recording is inputted from a user to the operating unit 11, and a time code of a recording end point obtained from the time code generating unit 16 in timing in which an operation for ending the recording is inputted from the user to the operating unit 11, and supplies the play list information to the disc write unit 48. Also, when supplied with play list information from a disc read unit 46, the play list memory 19 stores the play list information, and supplies the play list information to a display control unit 24. Further, the play list memory 19 stores a new play list created by editing processing, and supplies the new play list to the disc write unit 48.

The clip information memory 20 stores, as clip information, a recording position on an optical disc 41 of video recorded on the optical disc 41, the time code of the recording start point, and the time code of the recording end point, and supplies the clip information to the disc write unit 48. Also, when supplied with clip information from the disc read unit 46, the clip information memory 20 stores the clip information, and supplies the clip information to the display control unit 24.

A drive 21 comprises an optical head 42, a spindle motor 43, a servo control unit 44, an RF amplifier 45, the disc read unit 46, a drive control unit 47, and the disc write unit 48. The drive 21 records data onto the optical disc 41 and reads data from the optical disc 41 after the optical disc 41 is inserted. A configuration of the drive 21 will be described in the following.

The optical head 42 controls power of laser light on the basis of a recording signal supplied from the disc write unit 48, and thereby records the recording signal on the optical disc 41. The optical head 42 also irradiates the optical disc 41 with condensed laser light, subjects light reflected from the optical disc 41 to photoelectric conversion, thereby generates a current signal, and then supplies the current signal to the RF amplifier 45. Incidentally, an irradiation position of the laser light is controlled by a servo signal supplied from the servo control unit 44 to the optical head 42. As the optical disc 41, a disc capable of being overwritten repeatedly with recording signals is used.

The spindle motor 43 rotation-drives the optical disc 41 at CLV (Constant Linear Velocity), CAV (Constant Angular Velocity) or the like on the basis of a spindle motor driving signal from the servo control unit 44.

The servo control unit 44 performs focus servo operation and tracking servo operation. Specifically, the servo control unit 44 generates a focus servo signal or a tracking servo signal on the basis of a focus error signal or a tracking error signal from the RF amplifier 45, and then supplies the focus servo signal or the tracking servo signal to an actuator (not shown) of the optical head 42. The servo control unit 44 also performs spindle servo operation by generating a spindle motor driving signal for driving the spindle motor 43 and controlling the optical disc 41 to a desired rotational speed.

Further, the servo control unit 44 effects sled control to move the optical head 42 in a direction of a diameter of the optical disc 41 and thereby change the irradiation position of the laser light. Incidentally, a signal reading position of the optical disc 41 is set by the drive control unit 47, and the position of the optical head 42 is controlled so as to read a signal from the set reading position.

The RF amplifier 45 generates a focus error signal and a tracking error signal as well as a reproduced signal on the basis of the current signal from the optical head 42. The RF amplifier 45 then supplies the tracking error signal and the focus error signal to the servo control unit 44, and supplies the reproduced signal to the disc read unit 46.

The disc read unit 46 demodulates the reproduced signal supplied from the RF amplifier 45, thereby generates reproduced data, and performs error detection. The disc read unit 46 temporarily stores the reproduced data in a built-in memory, and supplies the reproduced data to a data expanding unit 22 as required. When the reproduced data generated by demodulating the reproduced signal from the RF amplifier 45 is play list data, the disc read unit 46 supplies the play list to the play list memory 19. When the reproduced data generated by demodulating the reproduced signal from the RF amplifier 45 is clip information data, the disc read unit 46 supplies the clip information to the clip information memory 20.

The drive control unit 47 controls the disc write unit 48 and the servo control unit 44 to record data onto the optical disc 41. Specifically, the drive control unit 47 makes the disc write unit 48 perform data modulation and supply a recording signal generated to the optical head 42. The drive control unit 47 then transmits a control signal for controlling a recording position on the optical disc 41 of the recording signal to the servo control unit 44.

The drive control unit 47 also controls the disc read unit 46 and the servo control unit 44 to reproduce data from the optical disc 41 on the basis of a play list supplied from the play list memory 19. Specifically, the drive control unit 47 transmits a control signal for controlling a reading position for reading a reproduced signal on the optical disc 41 to the servo control unit 44. The drive control unit 47 then makes the disc read unit 46 demodulate the reproduced signal from the RF amplifier 45.

The disc write unit 48 adds ECC (Error-Correcting Code) to compressed data having a time code added thereto which data is supplied from the buffer memory 18, thereafter modulates the compressed data, and thereby generates a recording signal. The disc write unit 48 then supplies the recording signal to the optical head 42. The disc write unit 48 also adds ECC to play list information supplied from the play list memory 19, thereafter modulates the play list information, and thereby generates a recording signal. The disc write unit 48 then supplies the recording signal to the optical head 42. The disc write unit 48 further adds ECC to clip information supplied from the clip information memory 20, thereafter modulates the clip information, and thereby generates a recording signal. The disc write unit 48 then supplies the recording signal to the optical head 42.

Though not shown in the figure, the drive 21 further comprises a disc insertion and ejection motor driven at times of insertion and ejection of the optical disc 41, and the like. This concludes the description of the internal configuration of the drive 21. The description of the internal configuration of the recording and reproducing apparatus 1 will be continued in the following.

The data expanding unit 22 expands reproduced data (compressed data) supplied from the disc read unit 46. The data expanding unit 22 supplies video data included in the reproduced data to a reproduced image memory 23, and supplies audio data included in the reproduced data to an audio memory 26. The reproduced image memory 23 temporarily stores the video data supplied from the data expanding unit 22, and then supplies the video data to the display control unit 24 in predetermined timing. Under control of the control unit 12, the display control unit 24 reads the video data from the reproduced image memory 23, and then supplies the video to an LCD (Liquid Crystal Display) 25 to display the video. The display control unit 24 also displays a play list from the play list memory 19 and clip information from the clip information memory 20 on the LCD 25.

The audio memory 26 temporarily stores the audio data supplied from the data expanding unit 22, and then supplies the audio data to an audio output unit 27 in predetermined timing. The audio output unit 27 comprises a speaker or the like. The audio output unit 27 outputs audio corresponding to the audio data supplied from the audio memory 26.

The recording processing of the recording and reproducing apparatus 1 will next be described with reference to flowcharts of FIGS. 2 to 4. It is to be noted that in the following description, video data and audio data will also be referred to collectively as AV data.

Figure 2:
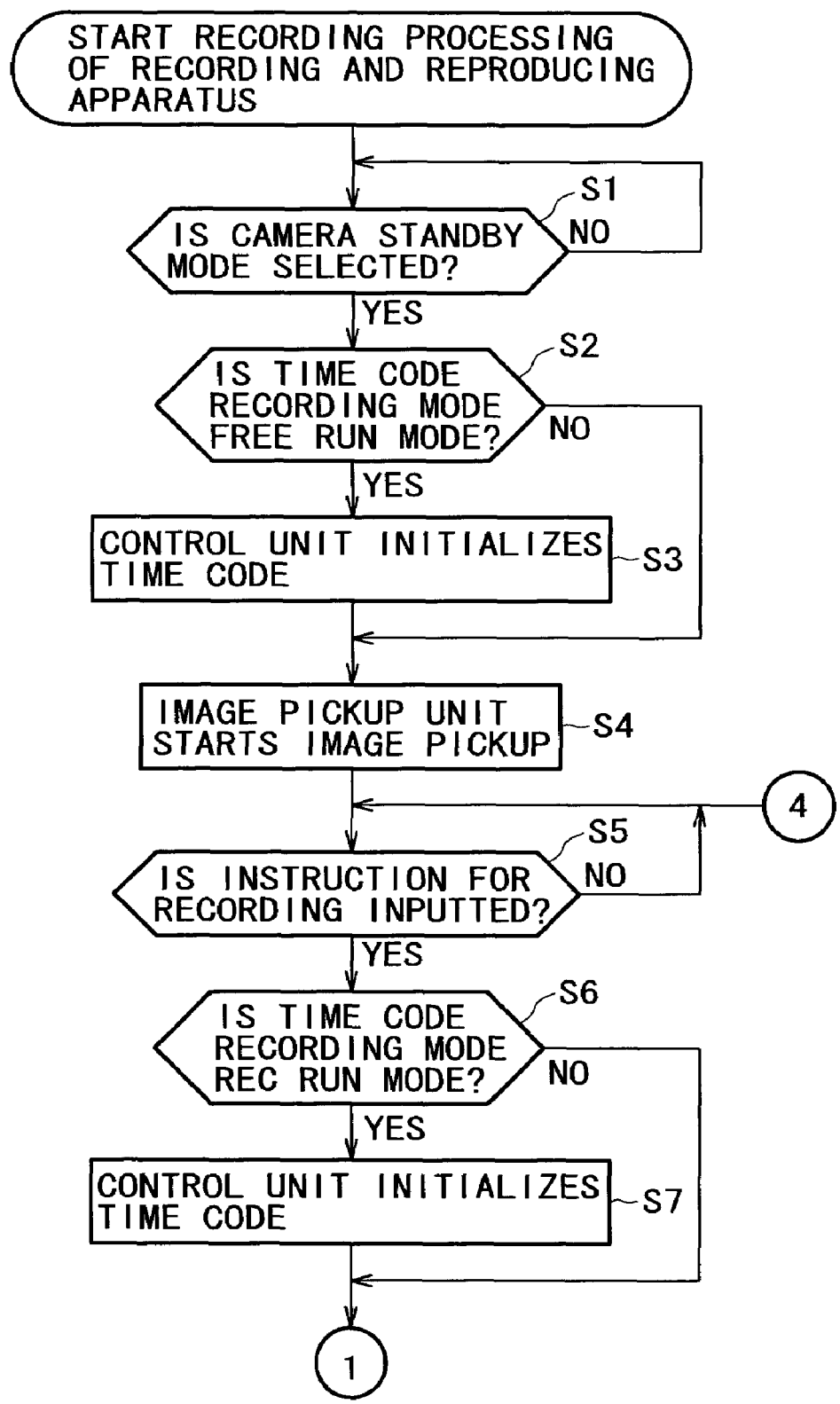
FIG. 2 is a flowchart of assistance in explaining recording processing of the recording and reproducing apparatus in FIG. 1.

At a step S1 in FIG. 2, the control unit 12 determines on the basis of operation information from the operating unit 11 whether an operation for selecting a camera standby mode is inputted, and stands by until an operation for selecting the camera standby mode is inputted. When an operation for selecting the camera standby mode is inputted from the operating unit 11, the control unit 12 determines at the step S1 that an operation for selecting the camera standby mode is inputted, and the processing proceeds to a step S2.

A time code recording mode includes two modes, that is, a free run mode and a REC run mode. The control unit 12 at the step S2 determines whether the time code recording mode is the free run mode. The time code recording mode will be described in the following. A time code comprises units of hours, minutes, seconds, and sixtieths of a second. Specifically, when a time code is "01:02:03:04," the leftmost "01" is in hours; "02," the second from the left is in minutes; "03," the third from the left is in seconds; and the rightmost "04" is in sixtieths of a second.

In the free run mode, the time code is set to "00:00:00:00" in timing in which the camera standby mode is selected. Hence, the time code recorded on the optical disc 41 corresponds to a time elapsed from the selection of the camera standby mode. On the other hand, in the REC run mode, the time code is set to "00:00:00:00" in timing in which an operation for giving an instruction to start recoding is inputted from the operating unit 11. Hence, the time code recorded on the optical disc 41 is recorded such that a time code of AV data recorded at a recording start point is "00:00:00:00."

Returning to FIG. 2, when the control unit 12 at the step S2 determines that the time code recording mode is the free run mode, the processing proceeds to a step S3.

At the step S3, the control unit 12 instructs the time code generating unit 16 to initialize time code. According to the instruction from the control unit 12, the time code generating unit 16 initializes the time code to "00:00:00:00." After the time code generating unit 16 sets the time code to "00:00:00:00" at the step S3, the time code generating unit 16 generates time code that increments in each sixtieth of a second, such for example as "00:00:00:01," "00:00:00:02," and "00:00:00:03." After the processing at the step S3, the processing proceeds to a step S4.

When the control unit 12 at the step S2 determines that the time code recording mode is not the free run mode, that is, determines that the time code recording mode is the REC run mode, the processing at the step S3 is skipped, and the processing proceeds to the step S4.

At the step S4, the control unit 12 instructs the image pickup unit 13 to start image pickup. According to the instruction from the control unit 12, the image pickup unit 13 starts image pickup. Thereafter the image pickup unit 13 continues image pickup processing until it is determined at a step S25 in FIG. 4 that the camera standby mode is cancelled, which will be described later. At the same time, the control unit 12 instructs the microphone 14 to start collecting sound. According to the instruction from the control unit 12, the microphone 14 starts collecting sound. Thereafter the microphone 14 continues sound collecting processing until it is determined at the step S25 in FIG. 4 that the camera standby mode is cancelled, which will be described later.

At a step S5, the control unit 12 determines on the basis of operation information from the operating unit 11 whether an instruction for recording is inputted from the user, and stands by until an instruction for recording is inputted. When an operation for giving an instruction for recording is inputted from the operating unit 11, the control unit 12 determines at the step S5 that an instruction for recording is inputted, and the processing proceeds to a step S6.

The control unit 12 determines at the step S6 whether the time code recording mode is the REC run mode. When the time code recording mode is the REC run mode, the processing proceeds to a step S7.

At the step S7, the control unit 12 instructs the time code generating unit 16 to initialize time code. According to the instruction from the control unit 12, the time code generating unit 16 initializes the time code to "00:00:00:00." After the time code generating unit 16 sets the time code to "00:00:00:00" at the step S7, the time code generating unit 16 generates time code that increments in each sixtieth of a second, such for example as "00:00:00:01," "00:00:00:02," and "00:00:00:03." After the processing at the step S7, the processing proceeds to a step S8 in FIG. 3.

Figure 3:
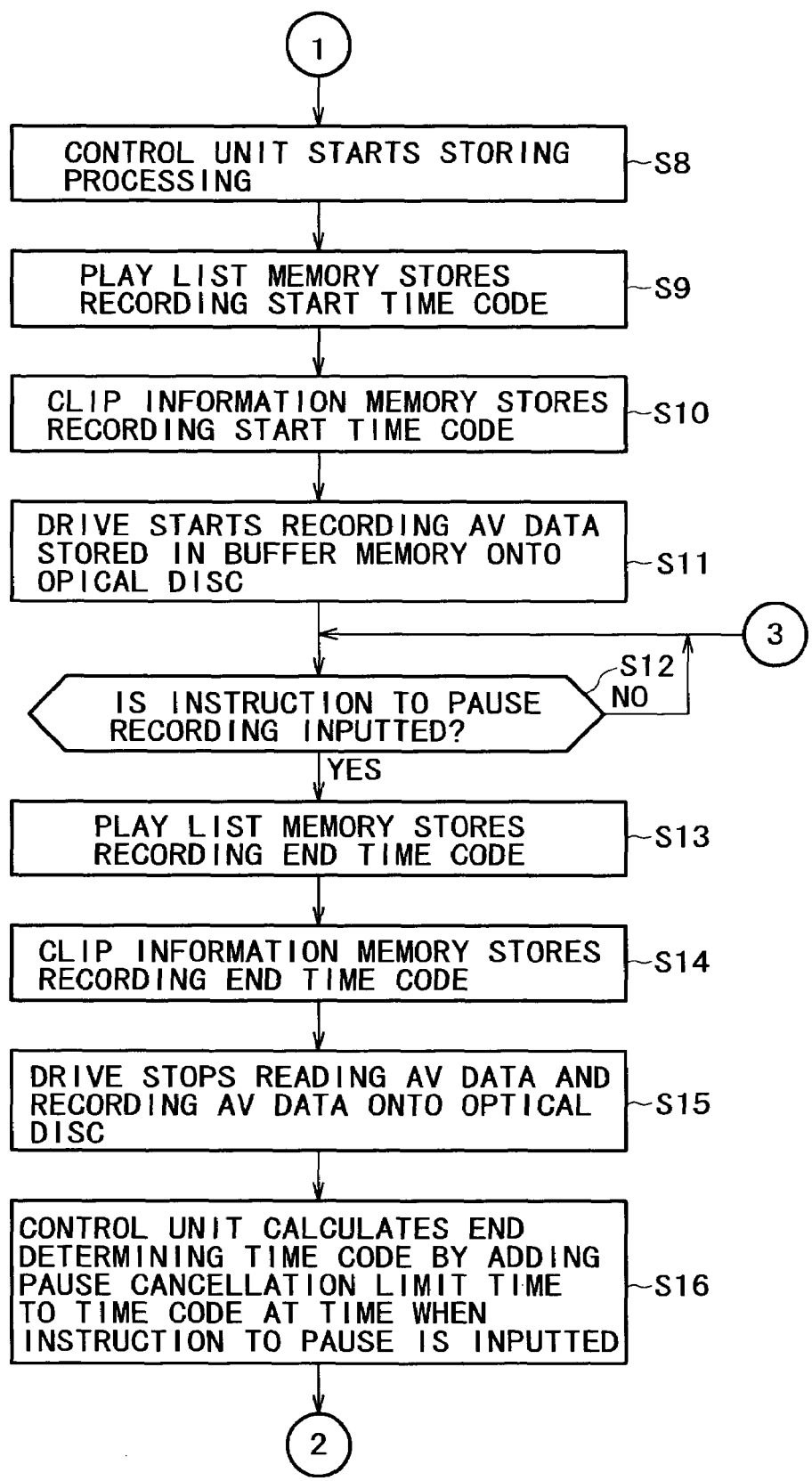
FIG. 3 is a flowchart, continued from FIG. 2, of assistance in explaining the recording processing of the recording and reproducing apparatus in FIG. 1.

When the control unit 12 at the step S6 determines that the time code recording mode is not the REC run mode, the processing at the step S7 is skipped, and the processing proceeds to the step S8 in FIG. 3.

At the step S8, the control unit 12 controls the image pickup unit 13, the microphone 14, the data compressing unit 15, the time code adding unit 17, and the buffer memory 18 to start storing AV data. Processing for storing AV data will be described in the following with reference to a flowchart of FIG. 5.

As described above, after the step S4, the image pickup unit 13 continues picking up images and the microphone 14 continues collecting sound. The image pickup unit 13 supplies a picked-up image (moving image) to the data compressing unit 15. The microphone 14 generates an audio signal corresponding to sound from the surroundings, and then supplies the audio signal to the data compressing unit 15. At a step S51 in FIG. 5, the data compressing unit 15 compresses the picked-up image supplied from the image pickup unit 13 and the audio signal supplied from the microphone 14, and then supplies compressed data (AV data) to the time code adding unit 17. At a step S52, the time code adding unit 17 adds, to the compressed data supplied from the data compressing unit 15, a time code generated by the time code generating unit 16 in the same timing, and then supplies the compressed data having the time code added thereto to the buffer memory 18. At a step S53, the buffer memory 18 stores the compressed data (AV data) having the time code added thereto which data is supplied from the time code adding unit 17.

The control unit 12 makes each part perform the above processing repeatedly. It is to be noted that while in FIG. 5, for convenience of description, the step S52 is carried out after completion of the processing at the step S51, and the processing at the step S53 is carried out after completion of the processing at the step S52, the processing from the step S51 to the step S53 may in practice be performed concurrently and independently.

Specifically, the data compressing unit 15 compresses video data from the image pickup unit 13 and audio data from the microphone 14 for one frame, and then supplies the compressed data to the time code adding unit 17. Thereafter, without waiting until the processing at the step S52 and the step S53 is performed, the data compressing unit 15 compresses next video data supplied from the image pickup unit 13 and next audio data supplied from the microphone 14. After adding a time code to the compressed data for one frame compressed at the step S51, the time code adding unit 17 adds a time code to next compressed data supplied from the data compressing unit 15 without waiting until the processing at the step S53 is performed.

Figure 6:
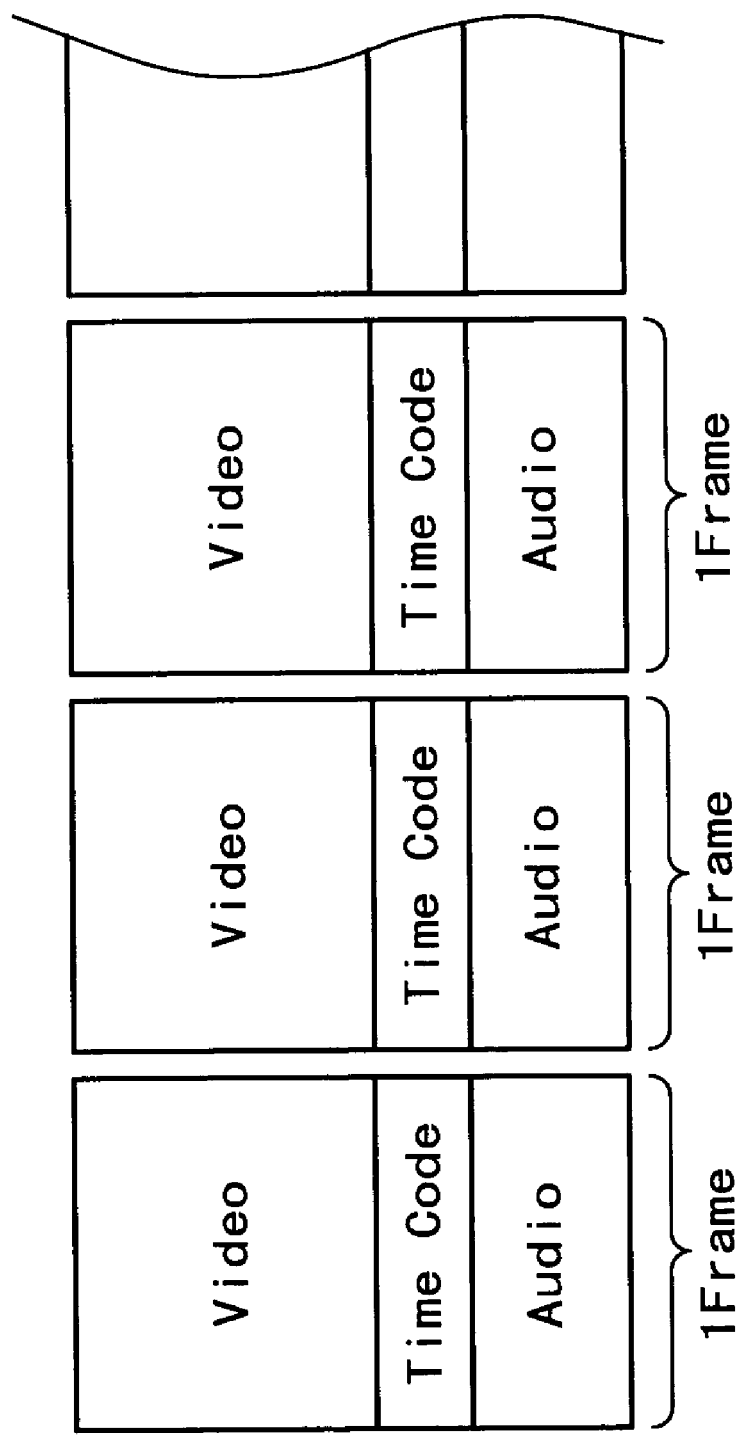
FIG. 6 is a diagram of assistance in explaining AV data to be recorded on an optical disc.

At and after the step S8, the buffer memory 18 successively stores compressed data having time codes added thereto. FIG. 6 shows an example of compressed data being stored in the buffer memory 18. As shown in FIG. 6, each frame of video data (Video) and the corresponding time code (Time Code) and audio data (Audio) form one set to be stored in the buffer memory 18. As represented by a plurality of frames of compressed data in FIG. 6, each frame of compressed data is sequentially supplied from the time code adding unit 17 and stored in the buffer memory 18.

The processing for storing AV data in the buffer memory 18 is continued until the storing processing is ended at a step S24 in FIG. 4 to be described later. There is a limit to storage capacity of the buffer memory 18. Therefore, as the buffer memory 18 continues storing compressed data, the buffer memory 18 stores compressed data to the limit of storage capacity of the buffer memory 18.

In this case, the buffer memory 18 overwrites oldest compressed data of the compressed data already stored therein with compressed data thereafter supplied from the time code adding unit 17. Thereby, the buffer memory 18 always stores newest compressed data for a predetermined time period. Incidentally, the predetermined time period is defined by the storage capacity of the buffer memory 18 (for example a period of three minutes).

After the processing at the step S8, the processing proceeds to a step S9.

At the step S9, the control unit 12 instructs the play list memory 19 to store a time code at a recording start point. According to the instruction from the control unit 12, the play list memory 19 stores a time code generated by the time code generating unit 16 as the time code at the recording start point.

At a step S10 following the step S9, the control unit 12 instructs the clip information memory 20 to store the time code at the recording start point. According to the instruction from the control unit 12, the clip information memory 20 stores the time code at the recording start point. At this time, the control unit 12 obtains information on a recording start position (address) on the optical disc 41 (information on a recording start position on the optical disc 41 will be referred to as recording start position information in the following description) in recording AV data on the optical disc 41, and stores the information in the clip information memory 20. After the processing at the step S10, the processing proceeds to a step S11.

At the step S11, the control unit 12 instructs the drive control unit 47 to start recording the compressed data (AV data) stored in the buffer memory 18 onto the optical disc 41. According to the instruction from the control unit 12, the drive control unit 47 starts recording the compressed data (AV data) stored in the buffer memory 18 onto the optical disc 41.

Specifically, the drive control unit 47 makes the disc write unit 48 sequentially read the compressed data (AV data) that started to be stored at the step S8 from the buffer memory 18. The disc write unit 48 adds ECC to the compressed data (AV data) read from the buffer memory 18, and then modulates the compressed data into a recording signal. Then, the drive control unit 47 controls the servo control unit 44 to position the optical head 42 at the recording position on the optical disc 41, and record the compressed data modulated into a recording signal by the disc write unit 48 from the optical head 42 onto the optical disc 41.

After the processing at the step S8, the buffer memory 18 stores compressed data successively supplied from the time code adding unit 17. After the processing at the step S11, the disc write unit 48 successively reads the compressed data from the buffer memory 18. Relation between compressed data storing positions (write addresses) and compressed data reading positions (read addresses) in the buffer memory 18 will be described in the following with reference to FIG. 7.

Figure 7:
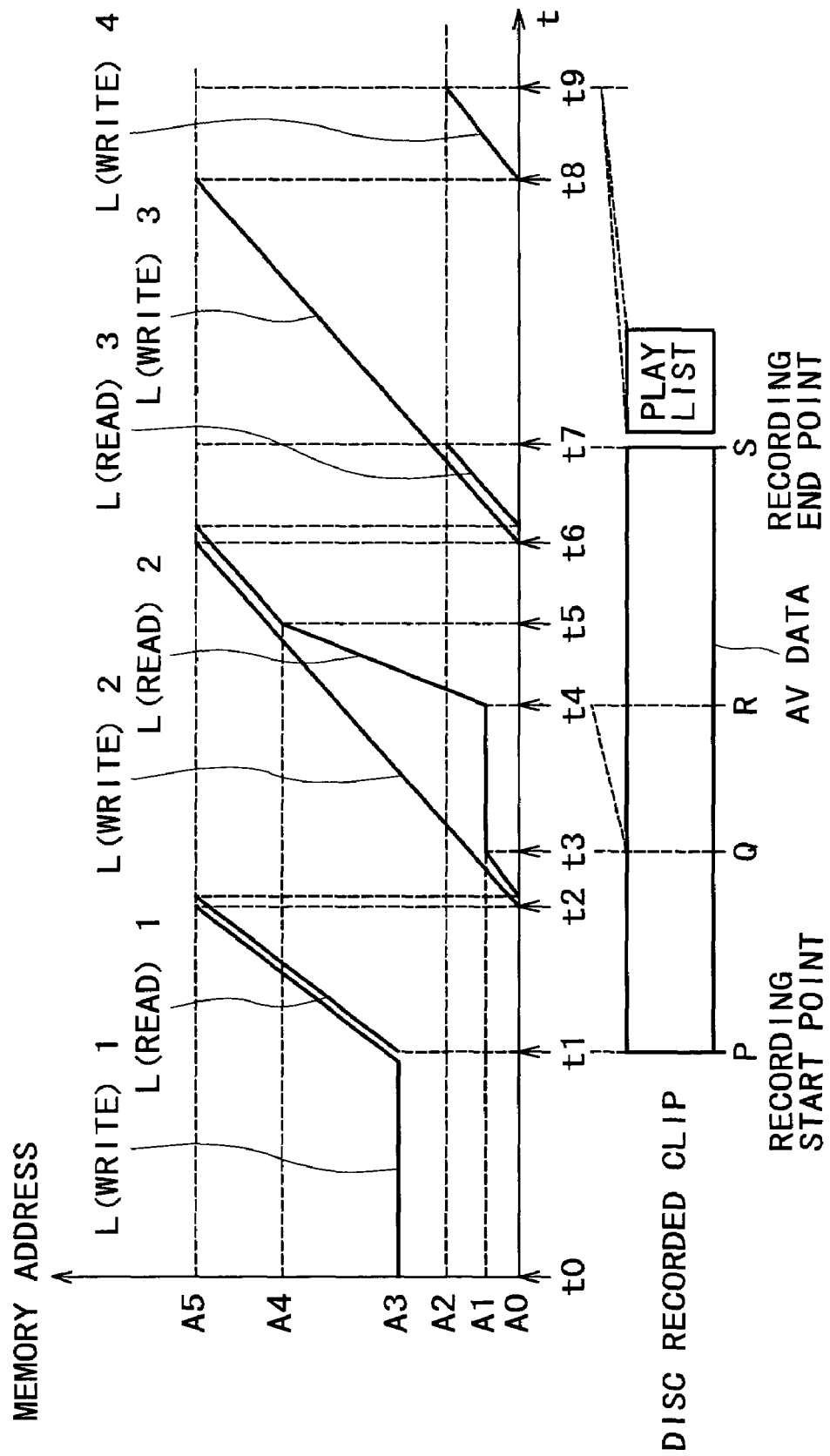
FIG. 7 is a diagram of assistance in explaining read addresses and write addresses of a buffer memory.

A graph of FIG. 7 shows read address and write address at time t. The write address refers to the address of compressed data (AV data) stored in the buffer memory 18, which data is supplied from the time code adding unit 17. The read address refers to the address in the buffer memory 18 of compressed data (AV data) read by the disc write unit 48 at and after the step S11.

In FIG. 7, the axis of abscissas indicates time t and the axis of ordinates indicates address in the buffer memory 18. A time t0 on the axis of abscissas indicates a time at which the image pickup unit 13 starts image pickup. A time t1 indicates a time at which an instruction to start recording is received (step S5). A time t3 and a time t7 indicate a time at which an instruction for a pause is received. A time t4 indicates a time at which an instruction to cancel the pause (resume recording) is received.

With "A5" shown on the axis of ordinates in FIG. 7, addresses in the buffer memory 18 are assigned in a range of 0 to "A5." Line segments indicated as L (write) 1, L (write) 2, L (write) 3, and L (write) 4 in FIG. 7 denote write address corresponding to time t. Line segments indicated as L (read) 1, L (read) 2, and L (read) 3 denote read address corresponding to time t.

Attention will now be directed to the write addresses L (write) 1, L (write) 2, L (write) 3, and L (write) 4. First directing attention to L (write) 1, the write address remains A3 from the time t0 to the time t1. During the period from the time t0 to the time t1, no AV data is stored in the buffer memory 18. After the time t1, at which the storing of compressed data (AV data) is started at the address A3 in the buffer memory 18 at the step S8, the write address gradually approaches A5 with the passage of time t. Immediately after the write address reaches A5 (time t2 in FIG. 7), the write address shifts to A0, and then the write address gradually approaches A5 with the passage of time t, as indicated by L (write) 2.

At a time t6, the write address again returns to A0, and again the write address gradually approaches A5 with the passage of time t, as indicated by L (write) 3. The write address thus continues to shift between A0 and A5. Hence, old AV data already stored at the same address is overwritten with newest AV data. Thus, the oldest compressed data (AV data) stored in the buffer memory 18 is replaced with the newest compressed data (AV data).

As against the write address shifted as described above, the read address shifts as indicated by L (read) 1 in FIG. 7 at the step S11. Specifically, after the time t1, L (read) 1 shifts in parallel with L (write) 1 so as to go along L (write) 1. This means that AV data supplied from the time code adding unit 17 and stored in the buffer memory 18 is read by the disc write unit 48 immediately after being stored, and that the reading speed is the same as the writing speed. The same is true after the address shifts to A0. During a period from the time t2 to the time t3, L (read) 2 shifts in parallel with L (write) 2 so as to go along L (write) 2.

At a step S12 after the step S11, the control unit 12 determines on the basis of operation information from the operating unit 11 whether an instruction to pause recording is inputted from the user, and stands by until an instruction to pause recording is inputted. When an instruction to pause recording is inputted from the operating unit 11, the control unit 12 determines at the step S12 that an instruction to pause recording is inputted, and the processing proceeds to a step S13.

At the step S13, the control unit 12 instructs the play list memory 19 to store a current time code as a time code at a recording end point. The play list memory 19 stores a time code obtained from the time code generating unit 16 in timing of receiving the instruction from the control unit 12 as the time code at the recording end point.

At a step S14, the control unit 12 instructs the clip information memory 20 to store a current time code as the time code at the recording end point. The clip information memory 20 stores a time code obtained from the time code generating unit 16 in timing of receiving the instruction from the control unit 12 as the time code at the recording end point.

It is to be noted that while for convenience of description, the processing at the step S13 and the step S14 is performed in that order, the processing at the step S13 and the step S14 is performed at the same time in practice. Hence, the time code at the recording end point stored in the play list memory 19 and the time code at the recording end point stored in the clip information memory 20 are the same time code.

At a step S15 after the processing at the step S14, the control unit 12 instructs the drive control unit 47 to stop reading compressed data (AV data) from the buffer memory 18 and recording the compressed data (AV data) onto the optical disc 41. According to the instruction from the control unit 12, the drive control unit 47 stops reading compressed data (AV data) from the buffer memory 18 and recording the compressed data (AV data) onto the optical disc 41. Specifically, the drive control unit 47 makes the disc write unit 48 stop reading compressed data (AV data) from the buffer memory 18. Also, the drive control unit 47 controls the servo control unit 44 to stop recording a recording signal from the optical head 42 onto the optical disc 41. The time t3 in FIG. 7 corresponds to the processing at the step S15. After the reading of compressed data (AV data) from the buffer memory 18 is stopped at the step S15 (time t3), the read address remains A1 until the time t4, at which the pause is cancelled (details will be described later), as indicated by L (read) 2 in FIG. 7.

It is to be noted that while the reading of compressed data (AV data) from the buffer memory 18 and the recording of a recording signal onto the optical disc 41 are stopped by the processing at the step S15, the processing of storing AV data in the buffer memory 18 is continued (L (write) 2).

At a step S16 after the processing at the step S15, the control unit 12 calculates an end determining time code by adding a preset time T as a pause cancellation limit time to the time code at the time when the instruction to pause is given (at the time when it is determined at the step S12 that the instruction to pause is given). After the processing of the step S16, the processing proceeds to a step S17 in FIG. 4. Incidentally, the pause cancellation limit time T can be set to a value desired by the user within the time during which the buffer memory 18 can store AV data. FIG. 7 represents an example in which the pause cancellation limit time T is set to the same value as a maximum time during which the buffer memory 18 can store AV data.

At the step S17, the control unit 12 monitors time code generated from the time code generating unit 16, and determines whether a current time code generated from the time code generating unit 16 has become the end determining time code calculated at the step S16. When the current time code has not become the end determining time code calculated at the step S16, the processing proceeds to a step S18.

At the step S18, the control unit 12 determines on the basis of operation information from the operating unit 11 whether an instruction to resume recording is inputted from the user. When an instruction to resume recording is not inputted from the operating unit 11, the processing returns to the step S17 to repeat the processing from the step S17 on down. When the control unit 12 determines at the step S18 that an instruction to resume recording is inputted from the operating unit 11, the processing proceeds to a step S19. The time t4 in FIG. 7 is a time at which the control unit 12 determines at the step S18 that an instruction to resume recording is inputted and processing at the step S19 is performed.

At the step S19, the control unit 12 instructs the drive control unit 47 to start high-speed recording on the optical disc 41 of AV data stored at addresses after the write address at the pause time (A1 in FIG. 7). According to the instruction from the control unit 12, the drive control unit 47 starts high-speed recording on the optical disc 41 of AV data stored at addresses after the write address at the pause time (A1 in FIG. 7). The drive control unit 47 records AV data before the pause time and AV data after the pause time as continuous AV data on the optical disc 41. It is to be noted that data judged to be continuous at a time of reproduction suffices as the continuous data, and that the continuous data is not limited to physically continuous data.

Specifically, the drive control unit 47 first makes the disc write unit 48 start high-speed reading of compressed data (AV data) from the address A1 toward the address A5 at the time t4 in FIG. 7. The disc write unit 48 adds ECC to the read compressed data (AV data), and modulates the compressed data into a recording signal. Incidentally, a speed at which the disc write unit 48 reads compressed data (AV data) from the buffer memory 18 is higher than a speed at which the time code adding unit 17 stores compressed data (AV data) in the buffer memory 18.

The drive control unit 47 next controls the servo control unit 44 to start high-speed recording of the recording signal created by the disc write unit 48 from the optical head 42 onto the optical disc 41. Incidentally, it is desirable that at the step S19, the speed at which the disc write unit 48 reads compressed data (AV data) from the buffer memory 18 and a speed at which the optical head 42 records the compressed data (AV data) onto the optical disc 41 be as high as possible from a viewpoint of performance.

The control unit 12 at the step S20 determines whether the read address in the buffer memory 18 has caught up with the write address, and stands by until the read address in the buffer memory 18 catches up with the write address. In the meantime, the drive 21 continues the high-speed reading of compressed data (AV data) from the buffer memory 18 and the high-speed recording of the compressed data (AV data) onto the optical disc 41. When the control unit 12 determines at the step S20 that the read address in the buffer memory 18 has caught up with the write address, the processing proceeds to a step S21. A time t5 in FIG. 7 represents a time at which the control unit 12 determines at the step S20 that the read address in the buffer memory 18 has caught up with the write address. Incidentally, in practice, the control unit 12 determines that the read address in the buffer memory 18 has caught up with the write address a little before the read address in the buffer memory 18 has completely caught up with the write address to become the same address as the write address.

At the step S21, the control unit 12 instructs the drive control unit 47 to change the speed of recording compressed data (AV data) onto the optical disc 41 to a single speed. According to the instruction from the control unit 12, the drive control unit 47 changes the speed of recording compressed data (AV data) onto the optical disc 41 to the single speed. Specifically, the drive control unit 47 changes the speed of reading compressed data (AV data) from the buffer memory 18 by the disc write unit 48 to a single speed and controls the servo control unit 44 to change the speed of recording the recording signal from the optical head 42 onto the optical disc 41 to a single speed. Consequently the reading speed at which the disc write unit 48 reads compressed data (AV data) from the buffer memory 18 coincides with the speed at which the time code adding unit 17 stores compressed data (AV data) in the buffer memory 18.

It is to be noted that while the description above is made by taking as an example a case where the speed of recording compressed data onto the optical disc 41 is changed to the single speed, this case is a mere example, and the recording speed is not necessarily changed to the single speed at all times. For example, when a physical recording position on the optical disc 41 is changed while compressed data is recorded on the optical disc 41, a time is required for the optical head 42 to perform a seek, and it is therefore not possible to record compressed data onto the optical disc 41 during that time. Hence, the speed of recording compressed data onto the optical disc 41 can be higher than the single speed after the seek. The recording speed can be higher than the single speed in other cases, such for example as a case where compressed data is recorded intermittently rather than continuously. Thus, in such cases, the speed of recording compressed data onto the optical disc 41 does not become the single speed even when the read address in the buffer memory 18 has caught up with the write address.

The address L (read) 2 in a period from the time t4 to the time t5 in FIG. 7 is shifted faster than L (write) 2 in the same period (section). This indicates high-speed reading. L (read) 2 after the time t5 is in parallel with L (write) 2 in the same period (section). This indicates that the reading speed is the single speed.

After the processing of the step S21, the processing returns to the step S12 in FIG. 3 to repeat the processing from the step S12 on down. Thus, the recording and reproducing apparatus 1 continues recording AV data onto the optical disc 41 until a next instruction to pause is inputted.

The description above has been made of a case where an instruction to resume recording is inputted within the pause cancellation limit time T after an instruction to pause is inputted. A case where no instruction to resume recording is inputted within the pause cancellation limit time T after an instruction to pause is inputted will next be described with reference to the flowchart of FIG. 4. Relation between write addresses and read addresses in this case is indicated by L (write) 3, L (write) 4, and L (read) 3 in FIG. 7. After a pause instruction is inputted at the time t7 in FIG. 7, the read address L (read) 3 remains unchanged at A2. As indicated by L (write) 3, the write address continues to shift toward A5 after the time t7, and after reaching A5 (time t8 in FIG. 7), the write address shifts to A0 to continue storing operation from A0.

Figure 4:
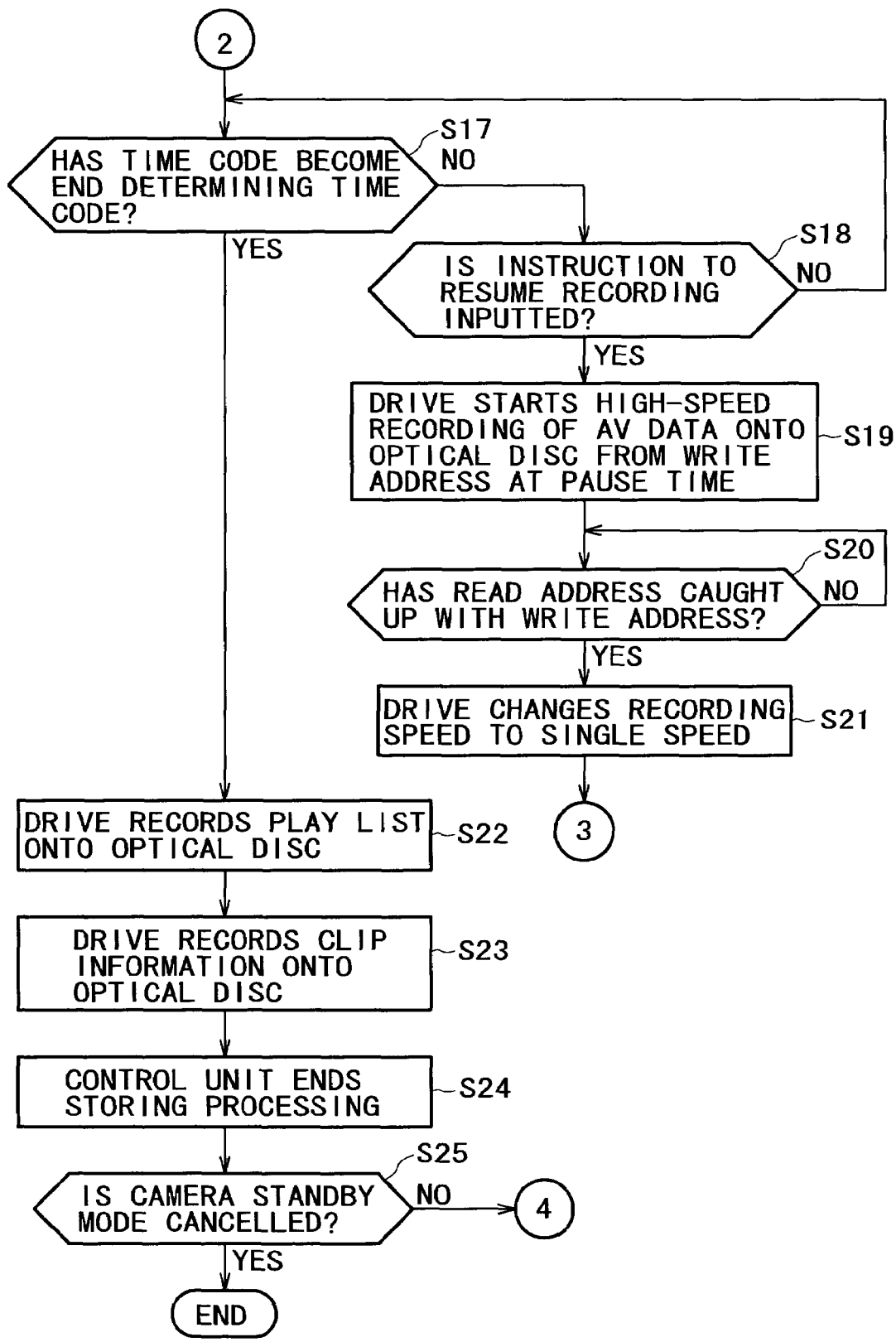
FIG. 4 is a flowchart, continued from FIG. 3, of assistance in explaining the recording processing of the recording and reproducing apparatus in FIG. 1.

When the control unit 12 determines at the step S17 in FIG. 4 that the current time code has become the end determining time code calculated at the step S16, the processing proceeds to a step S22.

At the step S22, the control unit 12 instructs the drive control unit 47 to record a play list onto the optical disc 41. According to the instruction from the control unit 12, the drive control unit 47 instructs the disc write unit 48 to read the time code at the recording start point and the time code at the recording end point from the play list memory 19. The disc write unit 48 reads the time code at the recording start point and the time code at the recording end point from the play list memory 19. The disc write unit 48 then adds ECC to the time codes, and modulates the time codes. The time code at the recording start point and the time code at the recording end point are combined to form a play list.

The drive control unit 47 records the play list read from the play list memory 19, provided with ECC, and modulated by the disc write unit 48 from the optical head 42 onto the optical disc 41. Incidentally, the play list is recorded immediately after the AV data of the corresponding cut, for example. Incidentally, in the present specification, a "cut" is synonymous with a "clip."

At a step S23 after the step S22, the control unit 12 instructs the drive control unit 47 to record clip information onto the optical disc 41. According to the instruction from the control unit 12, the drive control unit 47 instructs the disc write unit 48 to read the recording start position information indicating the AV data recording start position (address) on the optical disc 41, the time code at the recording start point, and the time code at the recording end point from the clip information memory 20. The disc write unit 48 reads the recording start position information, the time code at the recording start point, and the time code at the recording end point from the clip information memory 20. The disc write unit 48 adds ECC to the recording start position information and the time codes, and modulates the recording start position information and the time codes. The recording start position information, the time code at the recording start point, and the time code at the recording end point are combined to form clip information.

Then, the drive control unit 47 records the clip information read from the clip information memory 20, provided with ECC, and modulated by the disc write unit 48 from the optical head 42 onto the optical disc 41. Incidentally, it is desirable that clip information for all cuts be recorded together at a predetermined recording position on the optical disc 41.

Figure 5:
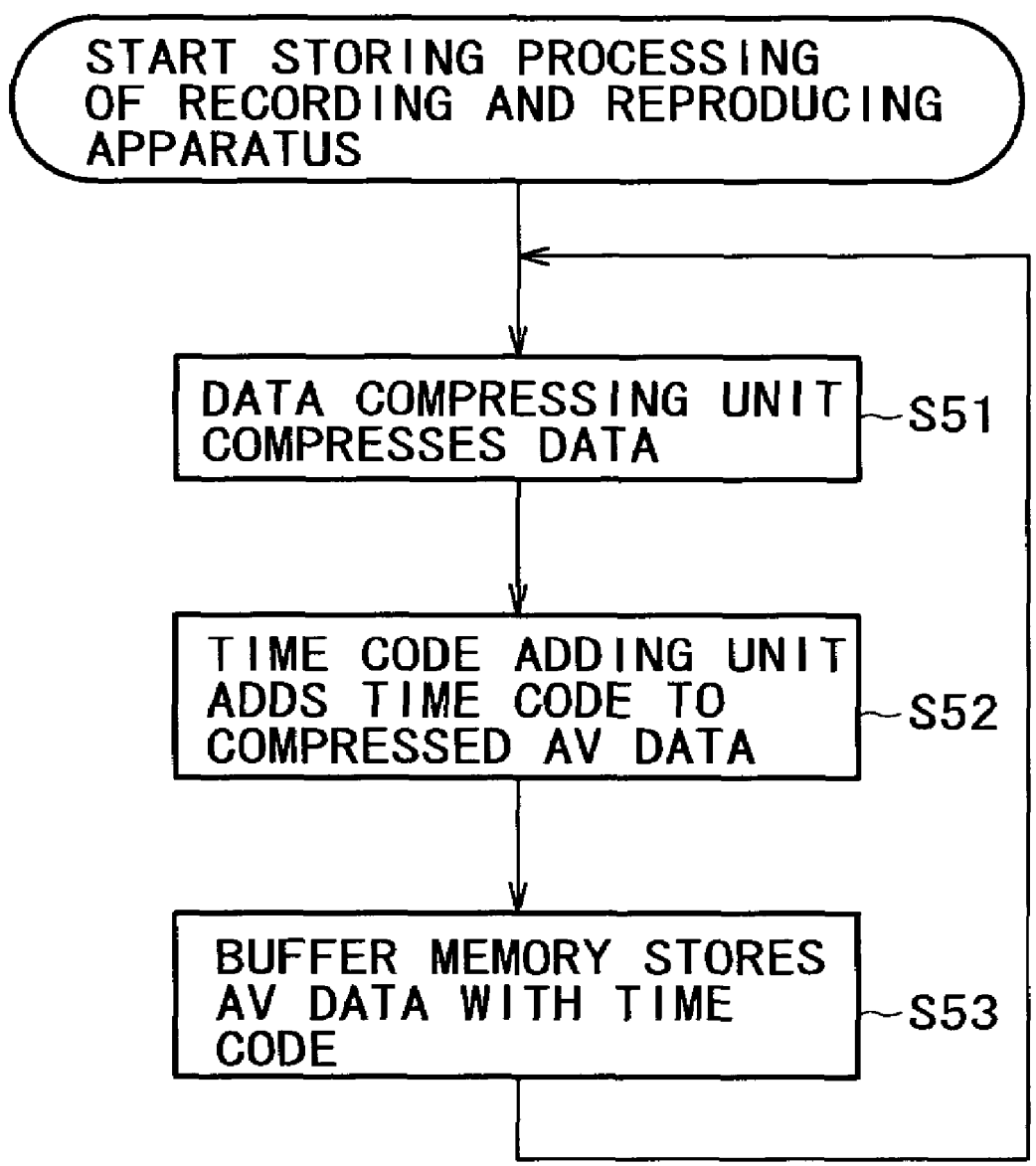
FIG. 5 is a flowchart of assistance in explaining storing processing of the recording and reproducing apparatus in FIG. 1.

At a step S24 after the processing of the step S23, the control unit 12 instructs the data compressing unit 15, the time code adding unit 17, and the buffer memory 18 to end the storing processing of FIG. 5. A time t9 in FIG. 7 represents a time at which the control unit 12 ends the storing processing at the step S24.

At a step S25 after the processing of the step S24, the control unit 12 determines whether the camera standby mode is cancelled on the basis of operation information from the operating unit 11. When the camera standby mode is not cancelled, the processing returns to the step S5 in FIG. 2 to repeat the processing from the step S5 on down. When the control unit 12 determines at the step S25 that the camera standby mode is cancelled, the recording processing is ended.

This concludes the description of the recording processing of the recording and reproducing apparatus 1. By repeating the recording processing as described above, the recording and reproducing apparatus 1 can record AV data for a plurality of cuts, play lists, and clip information onto the optical disc 41 within the storage capacity of the optical disc 41.

"DISC CLIP" is written under the graph of FIG. 7, and shown on the right side of "DISC CLIP" is correspondence between the compressed data (AV data) recorded on the optical disc 41 and the time of recording the compressed data (AV data). A point P of the compressed data (AV data) recorded on the optical disc 41 shown in the lower part of FIG. 7 represents the recording start point, and a point S represents the recording end point. A point Q denotes AV data at the time of input of the pause instruction.

A conventional recording and reproducing apparatus records on the optical disc 41 AV data from the recording start point P to the pause instruction point Q and AV data from a point R indicating the time of input of the instruction to resume recording to the recording end point S, but does not record on the optical disc 41 AV data from the pause instruction point Q to the recording resumption instruction point R. Therefore, even when a scene occurs which the user desires to pick up during a period from the pause to the recording resumption, the conventional recording and reproducing apparatus cannot record the scene on the optical disc 41.

On the other hand, the recording and reproducing apparatus 1 according to the present invention stores AV data for the period from the pause to the recording resumption in the buffer memory 18, and records the AV data during the pause period onto the optical disc 41 when recording is resumed within a predetermined time after the pause. Thereby, when a scene occurs which the user desires to pick up during the period from the pause to the recording resumption, the recording and reproducing apparatus 1 according to the present invention can record the scene on the optical disc 41. In addition, the recording and reproducing apparatus 1 according to the present invention can record compressed data (AV data) stored in the buffer memory 18 during a period from the stop of recording on the optical disc 41 at the step S15 to the recording resumption at the step S19 onto the optical disc 41 seamlessly with compressed data (AV data) before and after the compressed data (AV data) stored in the buffer memory 18 during the period from the stop of recording on the optical disc 41 at the step S15 to the recording resumption at the step S19.

It is to be noted that the processing of FIGS. 2 to 4 records AV data during a pause period onto the optical disc 41 when an instruction to resume recording is inputted within a predetermined time after input of a pause instruction; however, instead of this, AV data during a pause period may be recorded onto the optical disc 41 when an instruction to resume recording is inputted before a data amount of AV data stored in the buffer memory 18 reaches a predetermined data amount that is preset as a threshold value (the preset data amount will be referred to as a data amount A) after input of a pause instruction. In this case, the user can freely set the data amount A within the storage capacity of the buffer memory 18.

In the case where AV data during a pause period is recorded onto the optical disc 41 when an instruction to resume recording is inputted before a data amount of AV data stored in the buffer memory 18 reaches the preset data amount A after input of a pause instruction, the processing of the step S16 and the step S17 is different from the above-described processing. Specifically, at the step S16 after reading is stopped at the step S15, the control unit 12 starts monitoring the data amount of AV data stored in the buffer memory 18. The data amount of AV data stored in the buffer memory 18 after reading is stopped at the step S15 is increased with the passage of time. The control unit 12 at the step S17 determines whether the data amount of AV data stored in the buffer memory 18 after reading is stopped at the step S15 has reached the predetermined data amount A. When the data amount of AV data stored in the buffer memory 18 after reading is stopped at the step S15 has not reached the predetermined data amount A, the processing proceeds to the step S18. When the data amount of AV data stored in the buffer memory 18 after reading is stopped at the step S15 has reached the predetermined data amount A, the processing proceeds to the step S22.

Thus, AV data during a pause period can be recorded onto the optical disc 41 when an instruction to resume recording is inputted before a data amount of AV data stored in the buffer memory 18 reaches the preset data amount A after input of a pause instruction.

Further, in the above description, storing processing is not performed before starting the storing processing at the step S8 and after ending the storing processing at the step S24. However, storing processing may be started before the step S8. Also, the storing processing may be continued until it is determined at the step S25 that the camera standby mode is cancelled.

When the recording and reproducing apparatus 1 reproduces AV data recorded as described above on the optical disc 41, the recording and reproducing apparatus 1 first reads a time code at a recording start point and a time code at a recording end point that are recorded as a play list, and then reproduces AV data from the time code at the recording start point to the time code at the recording end point. Therefore a "recording start point" will also be referred to as a "reproduction start point" as appropriate in description below. A "recording end point" will also be referred to as a "reproduction end point."

Figure 8:
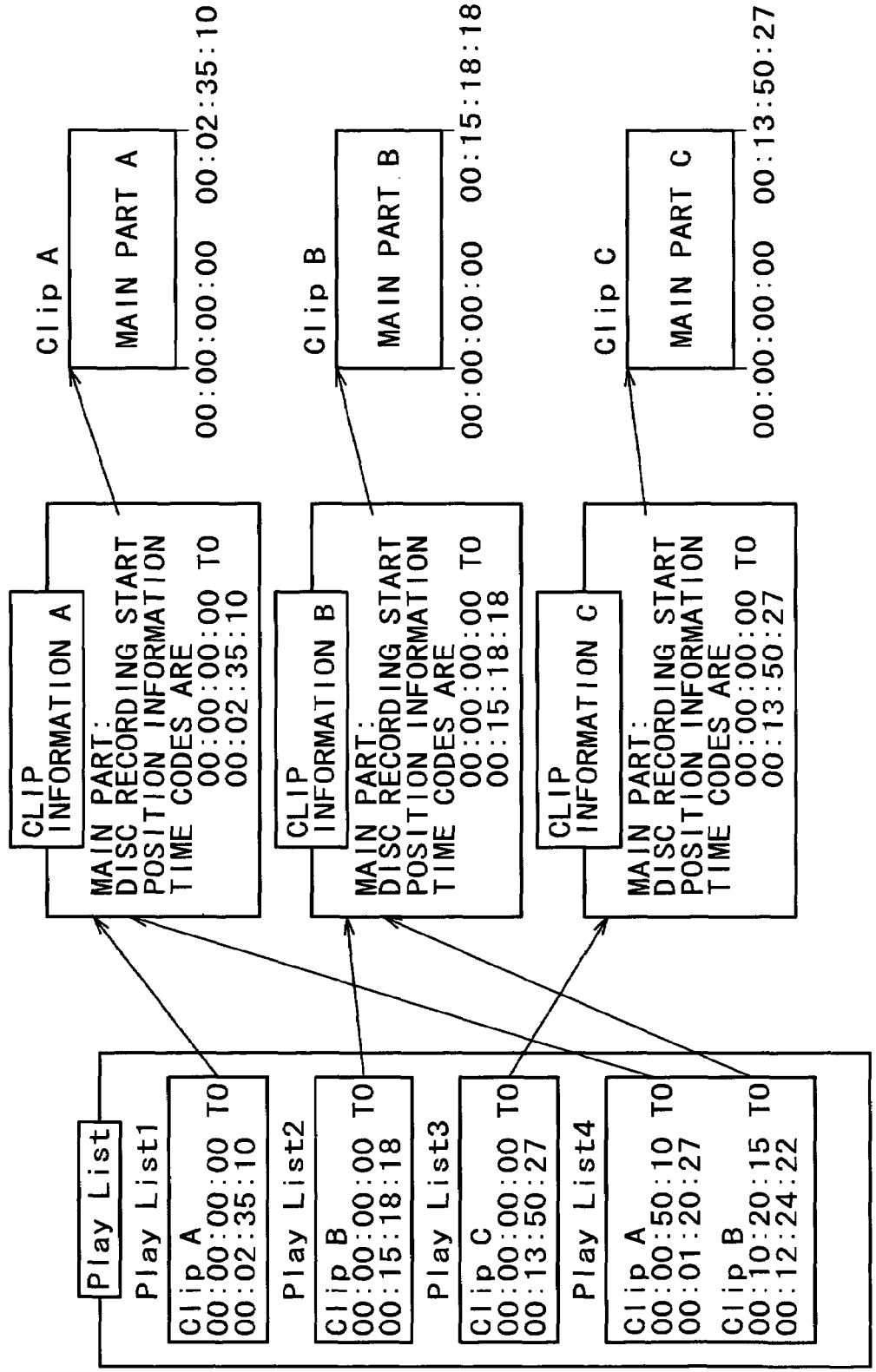
FIG. 8 is a diagram of assistance in explaining clip information and play lists.

FIG. 8 shows relation between play lists and clip information recorded as described above on the optical disc 41. FIG. 8 shows an example in which the time code recording mode is the REC mode. Three cuts of AV data, that is, a clip A, a clip B, and a clip C recorded on the optical disc 41 are shown on the rightmost side of FIG. 8.

Suppose that a time code at a recording start point of the clip A is "00:00:00:00" and a time code at a recording end point of the clip A is "00:02:35:10." In this case, clip information A (shown on the left side of the clip A in FIG. 8) corresponding to the clip A includes recording start position information indicating a recording start position of the clip A on the optical disc 41, the time code at the recording start point "00:00:00:00," and the time code at the recording end point "00:02:35:10." A play list 1 (play list 1 on the leftmost side of FIG. 8) corresponding to the clip A includes the time code at the recording start point "00:00:00:00" and the time code at the recording end point "00:02:35:10."

Similarly, suppose that a time code at a recording start point of the clip B is "00:00:00:00" and a time code at a recording end point of the clip B is "00:15:18:18." In this case, clip information B (shown on the left side of the AV data B in FIG. 8) corresponding to the clip B includes recording start position information indicating a recording start position of the clip B on the optical disc 41, the time code at the recording start point "00:00:00:00," and the time code at the recording end point "00:15:18:18." A play list 2 (play list 2 on the leftmost side of FIG. 8) corresponding to the clip B includes the time code at the recording start point "00:00:00: 00" and the time code at the recording end point "00:15:18: 18."

Similarly, suppose that a time code at a recording start point of the clip C is "00:00:00:00" and a time code at a recording end point of the clip C is "00:13:50:27." In this case, clip information C (shown on the left side of the AV data C in FIG. 8) corresponding to the clip C includes recording start position information indicating a recording start position of the clip C on the optical disc 41, the time code at the recording start point "00:00:00:00," and the time code at the recording end point "00:13:50:27." A play list 3 (play list 3 on the leftmost side of FIG. 8) corresponding to the clip C includes the time code at the recording start point "00:00:00: 00" and the time code at the recording end point "00:13:50: 27."

A play list 4 is shown in a lower part on the leftmost side of FIG. 8. The recording and reproducing apparatus 1 can extract only desired video (audio) from the clip A, the clip B, and the clip C recorded on the optical disc 41, connect together the video (audio), and edit the video (audio). The play list 4 is formed when parts of video (audio) from the clip A and the clip B are connected together. The play list 4 includes a time code "00:00:50:10" at a reproduction start point of the clip A and a time code "00:01:20:27" at a reproduction end point of the clip A, and a time code "00:10:20:15" at a reproduction start point of the clip B and a time code "00:12:24:22" at a reproduction end point of the clip B. When the recording and reproducing apparatus 1 reproduces AV data on the basis of the play list 4, the recording and reproducing apparatus 1 first reproduces AV data from the reproduction start point "00:00:50:10" of the clip A to the reproduction end point "00:01:20:27" of the clip A, and then reproduces AV data from the reproduction start point "00:10: 20:15" of the clip B to the reproduction end point "00:12:24: 22" of the clip B. In the play list 4, the time codes at the reproduction start points and the reproduction end points are changed from "00:00:00:00." It is thus possible to change the time codes at the reproduction start points and the reproduction end points.

Reproduction processing of the recording and reproducing apparatus 1 will next be described with reference to a flowchart of FIG. 9.

At a step S101, the control unit 12 determines on the basis of operation information from the operating unit 11 whether an operation for selecting a reproduction mode is inputted from the operating unit 11, and stands by until an operation for selecting the reproduction mode is inputted from the operating unit 11. When an operation for selecting the reproduction mode is inputted from the operating unit 11, the processing proceeds to a step S102.

At the step S102, the control unit 12 instructs the drive control unit 47 to read all play lists recorded on the optical disc 41. The drive control unit 47 controls the servo control unit 44 to read the play lists from the optical disc 41 by the optical head 42. The read play lists are subjected to demodulation and error detection by the disc read unit 46, and then stored in the play list memory 19.

At a step S103, the control unit 12 instructs the display control unit 24 to display the play lists on the LCD 25. According to the instruction from the control unit 12, the display control unit 24 reads all the play lists stored in the play list memory 19 at the step S102, and displays the play lists on the LCD 25. When the play lists 1 to 4 as shown in FIG. 8 are recorded on the optical disc 41, for example, the play lists 1 to 4 are displayed on the LCD 25. The display control unit 24 also displays a guide message prompting the user to select one play list on the LCD 25.

At a step S104, the control unit 12 receives a selection of one play list on the basis of operation information from the operating unit 11.

At a step S105, the control unit 12 determines whether an operation for giving an instruction for reproduction is inputted to the operating unit 11 on the basis of operation information from the operating unit 11, and stands by until an operation for giving an instruction for reproduction is inputted. When an operation for giving an instruction for reproduction is inputted from the operating unit 11, the processing proceeds to a step S106.

At the step S106, the control unit 12 instructs the drive control unit 47 to read clip information of AV data to be reproduced from the optical disc 41 on the basis of the play list selected at the step S104. For example, when the play list 1 in FIG. 8 is selected at the step S104, the control unit 12 instructs the drive control unit 47 to read the clip information of the clip A listed in the play list 1, that is, the clip information A. The drive control unit 47 controls the servo control unit 44 to read the clip information from the optical disc 41 by the optical head 42. The read clip information is demodulated by the disc read unit 46, and then stored in the clip information memory 20.

Incidentally, when as with the play list 4 in FIG. 8, for example, the play list selected at the step S104 includes a plurality of pieces of AV data to be reproduced (the clip A and the clip B in FIG. 8), the drive control unit 47 makes only the clip information A read first according to order of reproduction.

At a step S107 after the processing of the step S106, the control unit 12 determines a reproduction start position of the AV data on the optical disc 41 on the basis of information on a recording start position of the AV data on the optical disc 41, which information is included in the clip information read at the step S106.

At a step S108 after the step S107, the control unit 12 instructs the drive control unit 47 to read the AV data from the recording position of the AV data on the optical disc 41 which position corresponds to the reproduction start position determined at the step S107. According to the instruction from the control unit 12, the drive control unit 47 controls the servo control unit 44 to read the AV data from the reproduction start position on the optical disc 41 by the optical head 42. The read AV data is demodulated by the disc read unit 46, and then expanded by the data expanding unit 22. The video data is stored in the reproduced image memory 23 and the audio data is stored in the audio memory 26.

The video data stored in the reproduced image memory 23 is read by the display control unit 24, and then displayed on the LCD 25. The audio data stored in the audio memory 26 is read by the audio output unit 27 to output audio corresponding to the audio data. Thus, the display of the video and the output of the audio, the video and the audio corresponding to the play list selected at the step S104, are started.

At a step S109, the control unit 12 monitors the time code of the AV data being read by the optical head 42, to determine whether the time code of the AV data being read by the optical head 42 coincides with a time code at a reproduction end point included in the play list selected at the step S104. The control unit 12 stands by until the time code of the AV data being read by the optical head 42 coincides with the time code at the reproduction end point included in the play list selected at the step S104. When the control unit 12 determines that the time code of the AV data being read by the optical head 42 coincides with the time code at the reproduction end point included in the play list selected at the step S104, the processing proceeds to a step S110.

The control unit 12 determines at the step S110 whether there is AV data to be reproduced next on the basis of the play list selected at the step S104. When there is AV data to be reproduced next, the processing returns to the step S106 to repeat the processing from the step S106 on down. When the control unit 12 determines at the step S110 that there is no AV data to be reproduced next, the control unit 12 ends the series of reproduction processing steps.

In the case where the play list selected at the step S104 is the play list 4 in FIG. 8, for example, the AV data to be reproduced is the clip A and the clip B. Accordingly, the control unit 12 makes the clip information A read at the step S106 in a first round and makes the clip A read from the optical disc 41 at the steps S107 to S109. When the reading of the clip A is ended, the control unit 12 determines at the step S110 that there is the clip B to be reproduced next, and thus the processing returns to the step S106. The control unit 12 makes the clip information B read at the step S106 in a second round and makes the clip B read from the optical disc 41 at the steps S107 to S109. When the reading of the clip B is ended, the control unit 12 determines at the step S110 that there is no AV data to be reproduced next, and thus ends the reproduction processing.

Figure 9:
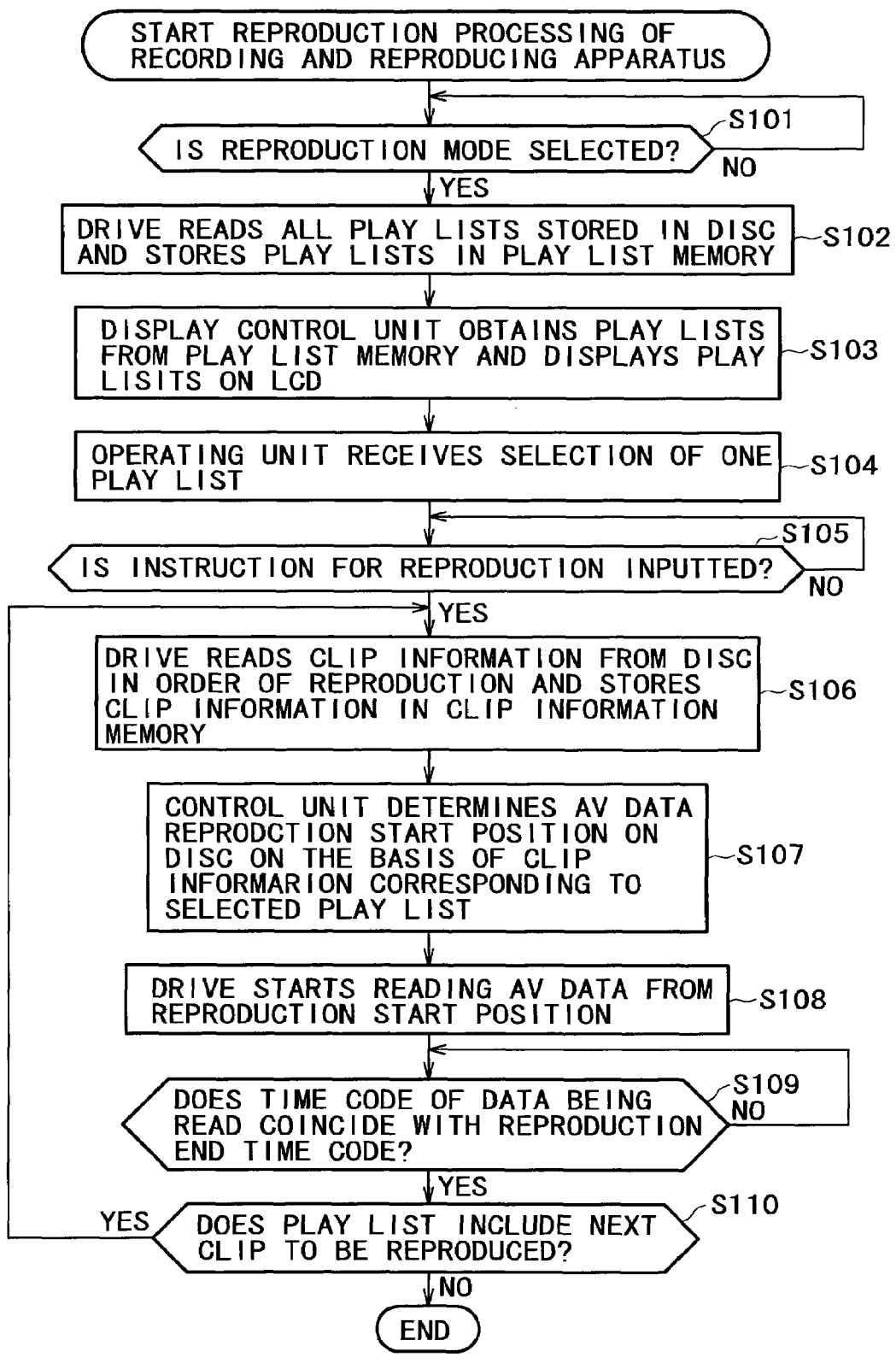
FIG. 9 is a flowchart of assistance in explaining reproduction processing of the recording and reproducing apparatus.

Incidentally, when an instruction to stop reproduction is inputted from the operating unit 11 while the reproduction processing of FIG. 9 is being performed, the control unit 12 discontinues processing being performed, and ends the reproduction processing.

Figure 10:
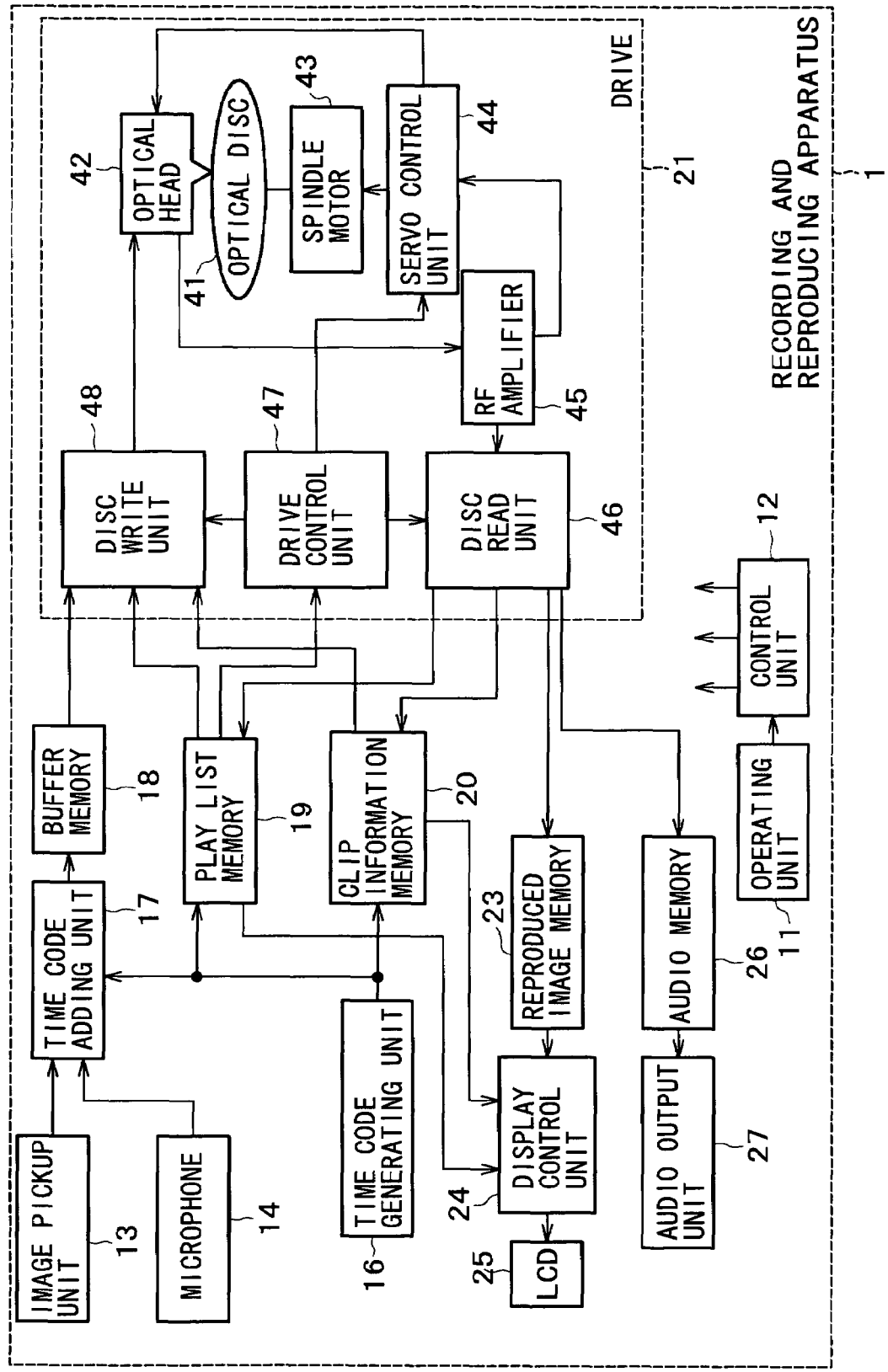
FIG. 10 is a block diagram showing an example of configuration of a recording and reproducing apparatus to which the present invention is applied, which example is different from that of FIG. 1.

The present invention is applicable to a recording and reproducing apparatus 1 as shown in FIG. 10. The recording and reproducing apparatus 1 in FIG. 10 is of a configuration formed by removing the data compressing unit 15 and the data expanding unit 22 from the recording and reproducing apparatus 1 in FIG. 1. Otherwise, the recording and reproducing apparatus 1 in FIG. 10 is of the same configuration as the recording and reproducing apparatus 1 in FIG. 1. In the case of the recording and reproducing apparatus 1 in FIG. 10, AV data recorded on the optical disc 41 is not compressed, and it is therefore possible to record AV data for only a short time as compared with the case of the recording and reproducing apparatus 1 in FIG. 1. However, it is possible to omit the processing of compressing data in recoding processing and omit the processing of expanding data in reproduction processing.

Figure 11:
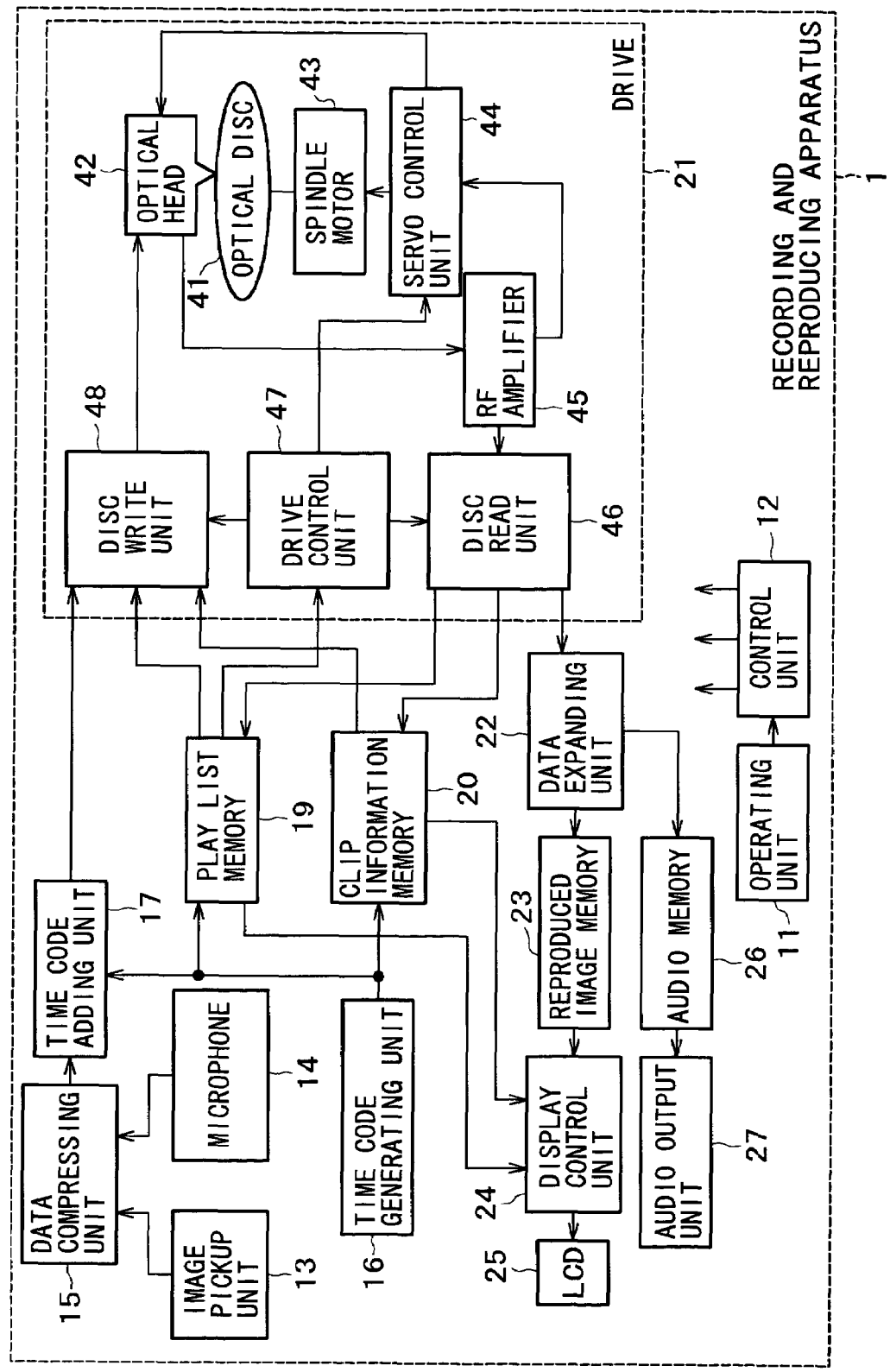
FIG. 11 is a block diagram showing an example of configuration of a recording and reproducing apparatus to which the present invention is applied, which example is different from that of FIG. 1 and FIG. 10.

Next, FIG. 11 shows an example to which the present invention is applied which example is different from either of the examples of FIG. 1 and FIG. 10. The recording and reproducing apparatus 1 in FIG. 11 is of a configuration formed by removing the buffer memory 18 from the recording and reproducing apparatus 1 in FIG. 1. Otherwise, the recording and reproducing apparatus 1 in FIG. 11 is of the same configuration as the recording and reproducing apparatus 1 in FIG. 1. The recording and reproducing apparatus 1 in FIG. 11 differs greatly in recording processing.

Figure 12:
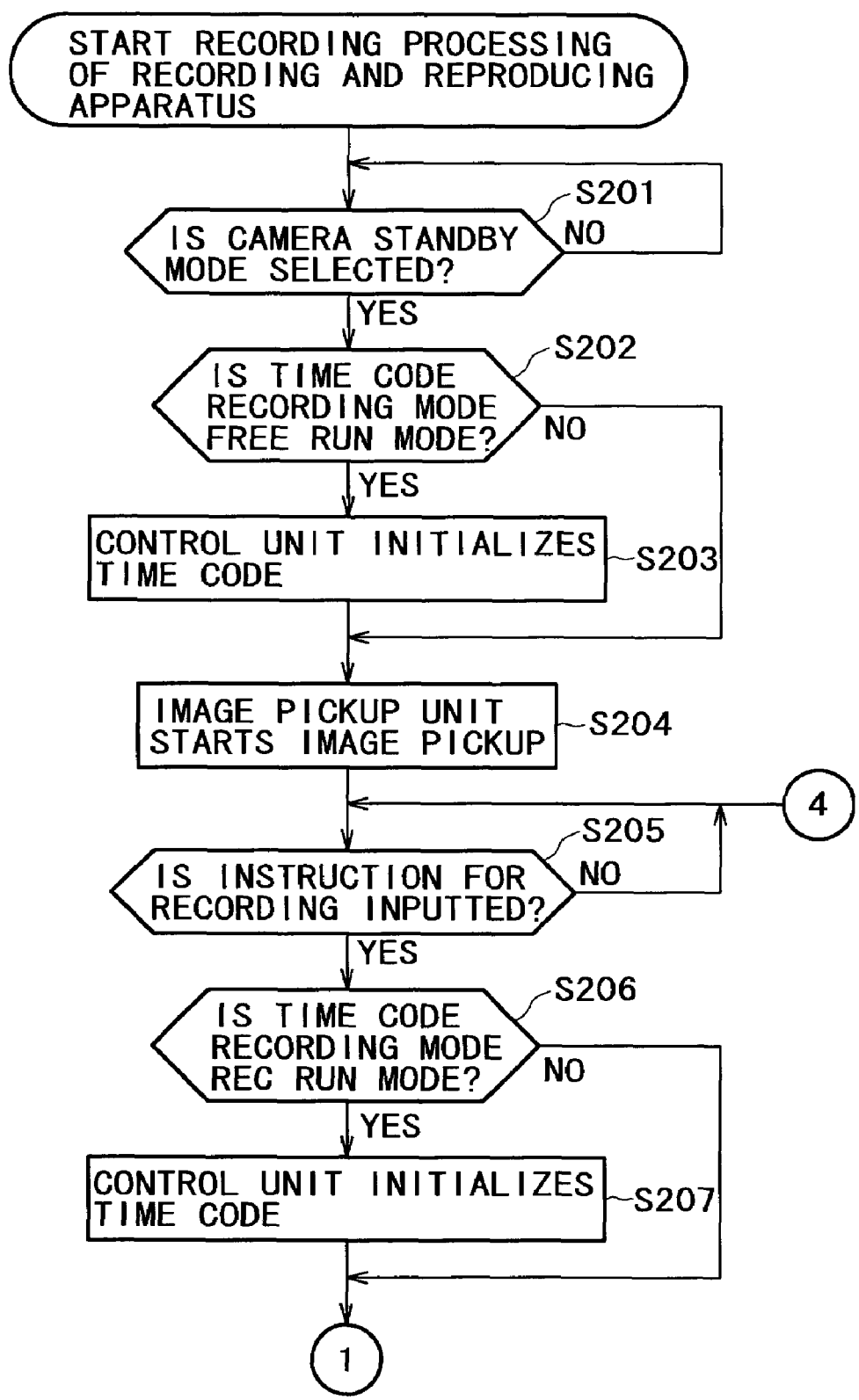
FIG. 12 is a flowchart of assistance in explaining recording processing of the recording and reproducing apparatus in FIG. 11.
Figure 13:
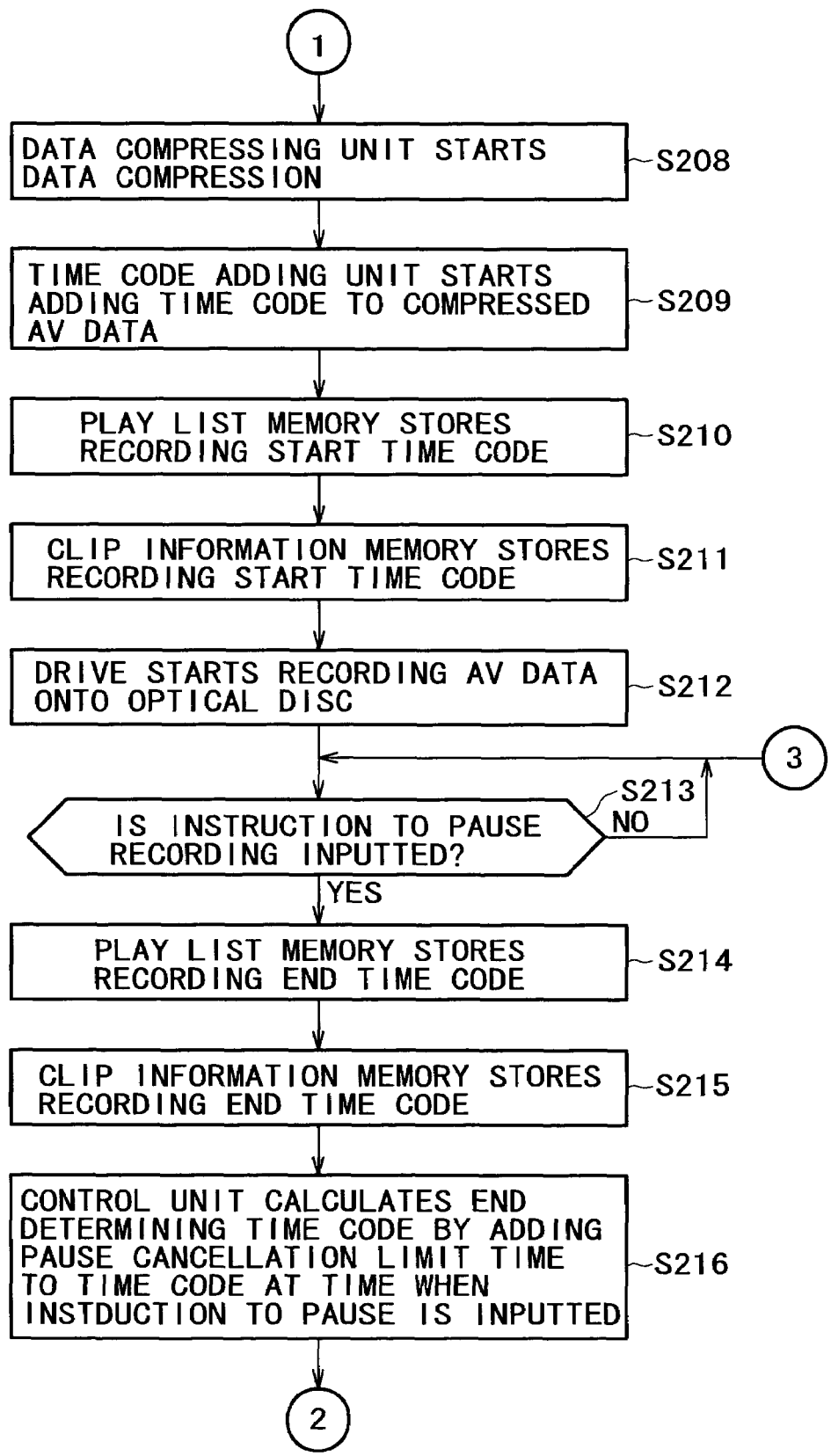
FIG. 13 is a flowchart, continued from FIG. 12, of assistance in explaining the recording processing of the recording and reproducing apparatus in FIG. 11.

The recording processing of the recording and reproducing apparatus 1 in FIG. 11 will next be described with reference to flowcharts of FIGS. 12 to 14. Incidentally, processing of steps S201 to S207 in FIG. 12 is the same as the processing of the steps S1 to S7 in FIG. 2. Therefore the processing of the steps S201 to S207 in FIG. 12 will be described in a simplified manner.

At the step S201 in FIG. 12, a control unit 12 stands by until an operation for selecting the camera standby mode is inputted from an operating unit 11. When an operation for selecting the camera standby mode is inputted from the operating unit 11, the processing proceeds to the step S202. The control unit 12 at the step S202 determines whether the time code recording mode is the free run mode. When the time code recording mode is the free run mode, the processing proceeds to the step S203.

At the step S203, according to an instruction from the control unit 12, a time code generating unit 16 initializes the time code to "00:00:00:00." After the processing at the step S203, the processing proceeds to the step S204. When the control unit 12 at the step S202 determines that the time code recording mode is not the free run mode, that is, determines that the time code recording mode is the REC run mode, the processing at the step S203 is skipped, and the processing proceeds to the step S204.

At the step S204, according to an instruction from the control unit 12, an image pickup unit 13 starts image pickup. Thereafter the image pickup unit 13 continues image pickup processing until it is determined at a step S225 in FIG. 14 that the camera standby mode is cancelled, which will be described later. At the same time, according to an instruction from the control unit 12, a microphone 14 starts collecting sound. Thereafter the microphone 14 continues sound collecting processing until it is determined at the step S225 in FIG. 14 that the camera standby mode is cancelled, which will be described later.

At the step S205, the control unit 12 stands by until an instruction for recording is inputted from the operating unit 11. When an operation for giving an instruction for recording is inputted, the processing proceeds to the step S206. The control unit 12 determines at the step S206 whether the time code recording mode is the REC run mode. When the time code recording mode is the REC run mode, the processing proceeds to the step S207. At the step S207, according to an instruction from the control unit 12, the time code generating unit 16 initializes the time code to "00:00:00:00." After the processing at the step S207, the processing proceeds to a step S208 in FIG. 13. When the control unit 12 at the step S206 determines that the time code recording mode is not the REC run mode, the processing at the step S207 is skipped, and the processing proceeds to the step S208 in FIG. 13.

At the step S208, the control unit 12 instructs a data compressing unit 15 to start data compression. As described above, after the step S204, the image pickup unit 13 continues picking up images and the microphone 14 continues collecting sound. The image pickup unit 13 supplies a picked-up image (moving image) to the data compressing unit 15. The microphone 14 generates an audio signal corresponding to sound from the surroundings, and then supplies the audio signal to the data compressing unit 15. Then, at the step S208 in FIG. 13, the data compressing unit 15 starts compressing the picked-up image supplied from the image pickup unit 13 and the audio signal supplied from the microphone 14. That is, the data compressing unit 15 compresses the picked-up image supplied from the image pickup unit 13 and the audio signal supplied from the microphone 14 by a predetermined compression method, and then supplies compressed data (AV data) to a time code adding unit 17. The data compressing unit 15 thereafter continues compressing picked-up images and audio signals until processing of a step S223 in FIG. 14 to be described later.

At a step S209, the time code adding unit 17 starts adding, to the compressed data supplied from the data compressing unit 15, a time code generated by the time code generating unit 16 in the same timing. The time code adding unit 17 thereafter continues adding a time code to compressed data supplied from the data compressing unit 15 until processing of a step S224 in FIG. 14 to be described later.

At a step S210, the control unit 12 instructs a play list memory 19 to store a time code at a recording start point. According to the instruction from the control unit 12, the play list memory 19 stores a time code generated by the time code generating unit 16 as the time code at the recording start point.

At a step S211, the control unit 12 instructs a clip information memory 20 to store the time code at the recording start point. According to the instruction from the control unit 12, the clip information memory 20 stores the time code at the recording start point. At this time, the control unit 12 obtains information on a recording start position (address) on an optical disc 41 (information on a recording start position on the optical disc 41 will be referred to as recording start position information in the following description) in recording AV data on the optical disc 41, and stores the information in the clip information memory 20. After the processing at the step S211, the processing proceeds to a step S212.

At the step S212, the control unit 12 instructs a drive control unit 47 to start recording the compressed data (AV data) having the time code added thereto by the time code adding unit 17 onto the optical disc 41. According to the instruction from the control unit 12, the drive control unit 47 starts recording the compressed data (AV data) having the time code added thereto by the time code adding unit 17 onto the optical disc 41.

Specifically, the drive control unit 47 makes a disc write unit 48 sequentially read the compressed data (AV data) that started to have a time code added thereto at the step S209 from the time code adding unit 17. The disc write unit 48 adds ECC to the compressed data (AV data) read from the time code adding unit 17, and then modulates the compressed data into a recording signal. Then, the drive control unit 47 controls a servo control unit 44 to position an optical head 42 at the recording position on the optical disc 41, and record the compressed data modulated into a recording signal by the disc write unit 48 from the optical head 42 onto the optical disc 41.

After the step S212, the drive 21 continues recording compressed data (AV data) onto the optical disc 41 until processing of a step S219 in FIG. 14 to be described later.

At a step S213 after the step S212, the control unit 12 determines on the basis of operation information from the operating unit 11 whether an instruction to pause recording is inputted from the user, and stands by until an instruction to pause recording is inputted. When an instruction to pause recording is inputted from the operating unit 11, the control unit 12 determines at the step S213 that an instruction to pause recording is inputted, and the processing proceeds to a step S214.

At the step S214, the control unit 12 instructs the play list memory 19 to store a current time code as a time code at a recording end point. The play list memory 19 stores a time code obtained from the time code generating unit 16 in timing of receiving the instruction from the control unit 12 as the time code at the recording end point.

At a step S215, the control unit 12 instructs the clip information memory 20 to store a current time code as the time code at the recording end point. The clip information memory 20 stores a time code obtained from the time code generating unit 16 in timing of receiving the instruction from the control unit 12 as the time code at the recording end point.

It is to be noted that while for convenience of description, the processing at the step S214 and the step S215 is performed in that order, the processing at the step S214 and the step S215 is performed at the same time in practice. Hence, the time code at the recording end point stored in the play list memory 19 and the time code at the recording end point stored in the clip information memory 20 are the same time code.

At a step S216, the control unit 12 calculates an end determining time code by adding a preset time T as a pause cancellation limit time to the time code at the time when the instruction to pause is given (at the time when it is determined at the step S213 that the instruction to pause is given). After the processing of the step S216, the processing proceeds to a step S217 in FIG. 14. Incidentally, the pause cancellation limit time T can be set to a value desired by the user.

At the step S217, the control unit 12 monitors time code generated from the time code generating unit 16, and determines whether a current time code has become the end determining time code calculated at the step S216. When the current time code has not become the end determining time code calculated at the step S216, the processing proceeds to a step S218.

At the step S218, the control unit 12 determines on the basis of operation information from the operating unit 11 whether an instruction to resume recording is inputted from the user. When an instruction to resume recording is not inputted from the operating unit 11, the processing returns to the step S217 to repeat the processing from the step S217 on down. When the control unit 12 determines at the step S218 that an instruction to resume recording is inputted from the operating unit 11, the processing returns to the step S213 in FIG. 13 to repeat the processing from the step S213 on down.

The description above has been made of a case where an instruction to resume recording is inputted within the pause cancellation limit time T after an instruction to pause is inputted. A case where no instruction to resume recording is inputted within the pause cancellation limit time T after an instruction to pause is inputted will next be described with reference to the flowchart of FIG. 14.

Figure 14:
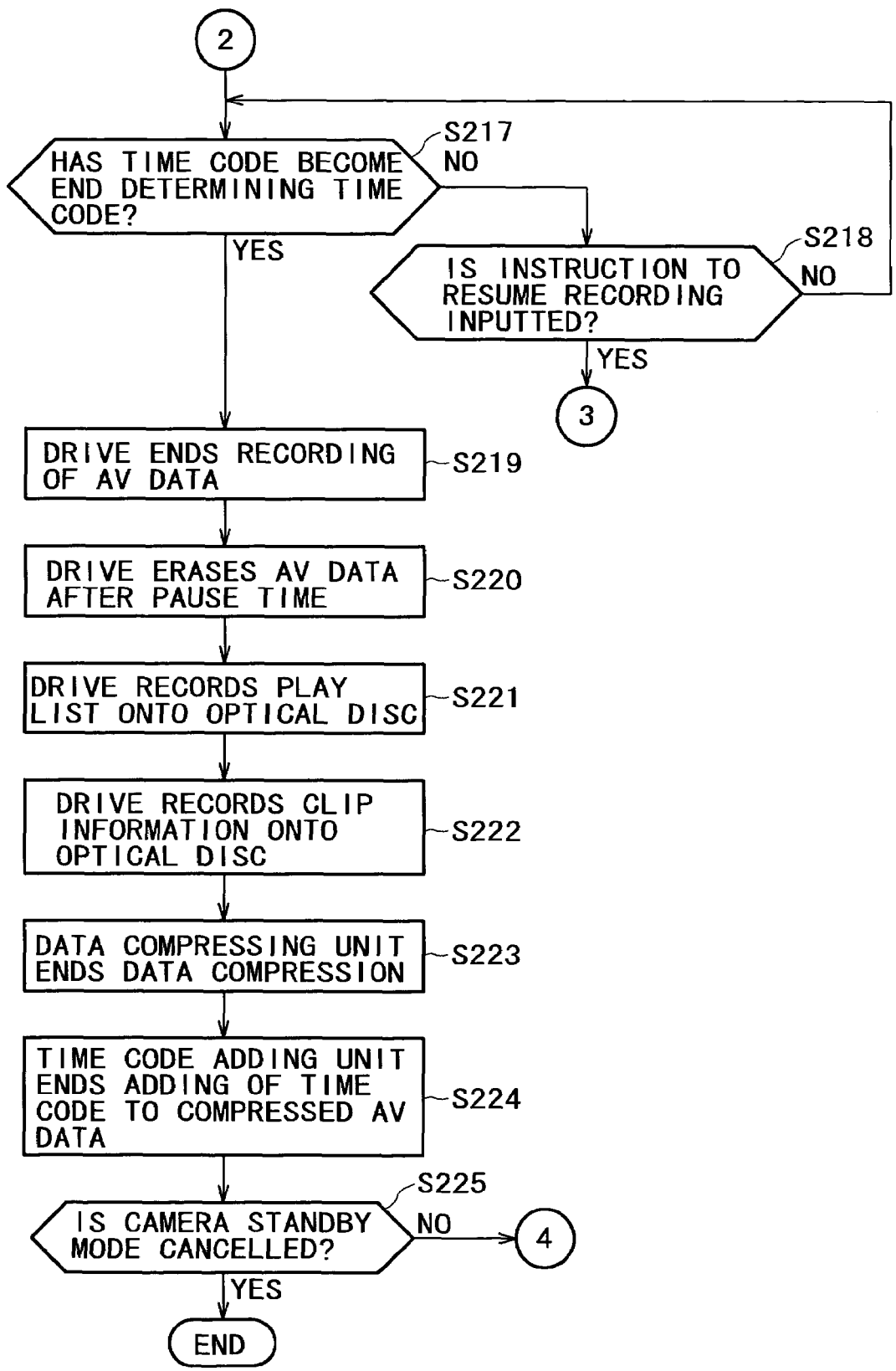
FIG. 14 is a flowchart, continued from FIG. 13, of assistance in explaining the recording processing of the recording and reproducing apparatus in FIG. 11.

When the control unit 12 determines at the step S217 in FIG. 14 that the current time code has become the end determining time code calculated at the step S216, the processing proceeds to a step S219.

At the step S219, the control unit 12 instructs the drive control unit 47 to end the recording of compressed data (AV data) onto the optical disc 41. According to the instruction from the control unit 12, the drive control unit 47 ends the recording of compressed data (AV data) onto the optical disc 41. Specifically, the drive control unit 47 ends the reading of compressed data (AV data) from the time code adding unit 17 by the disc write unit 48 and ends the recoding of the recording signal from the optical head 42 onto the optical disc 41. Thereafter the processing proceeds to a step S220.

At the step S220, the control unit 12 instructs the drive control unit 47 to erase from the optical disc 41 compressed data (AV data) recorded on the optical disc 41 after a point in time when an instruction to pause was inputted last at the step S213. According to the instruction from the control unit 12, the drive control unit 47 erases from the optical disc 41 the compressed data (AV data) recorded on the optical disc 41 after the point in time when the instruction to pause was inputted at the step S213. Specifically, the drive control unit 47 refers to the time code at the recording end point stored in the clip information memory 20, and determines a recording position of the compressed data (AV data) recorded on the optical disc 41 after the point in time when the instruction to pause was inputted at the step S213. The drive control unit 47 then controls the disc write unit 48 and the servo control unit 44 to erase the compressed data (AV data) recorded at the determined recording position. Hence, in other than the case of the last instruction to pause, that is, in cases where although an instruction to pause is inputted, an instruction to resume recording is inputted, the compressed data is retained as it is on the optical disc 41 without being erased.

It is to be noted that actually erasing the compressed data itself recorded on the optical disc 41 by controlling the disc write unit 48 and the servo control unit 44 is one example; the compressed data recorded on the optical disc 41 does not necessarily need to be erased. Specifically, the time code at the recording end point is obtained at the step S214 and the step S215, and a play list and clip information including the time code at the recording end point are recorded on the optical disc 41 at a step S221 and a step S222 to be described later. When the optical disc 41 is reproduced, the compressed data is read on the basis of the recorded play list and clip information. Therefore, the compressed data recorded on the optical disc 41 is not read after the time code at the recording end point is obtained at the step S214 and the step S215. The compressed data can thus be considered to be erased in effect.

At a step S221 after the step S220, the control unit 12 instructs the drive control unit 47 to record a play list onto the optical disc 41. According to the instruction from the control unit 12, the drive control unit 47 instructs the disc write unit 48 to read the time code at the recording start point and the time code at the recording end point from the play list memory 19. The disc write unit 48 reads the time code at the recording start point and the time code at the recording end point from the play list memory 19. The disc write unit 48 then adds ECC to the time codes, and modulates the time codes. The time code at the recording start point and the time code at the recording end point are combined to form a play list. The drive control unit 47 records the play list read from the play list memory 19, provided with ECC, and modulated by the disc write unit 48 from the optical head 42 onto the optical disc 41. Incidentally, the play list is recorded immediately after the AV data of the corresponding cut.

At a step S222 after the step S221, the control unit 12 instructs the drive control unit 47 to record clip information onto the optical disc 41. According to the instruction from the control unit 12, the drive control unit 47 instructs the disc write unit 48 to read the recording start position information indicating the AV data recording start position (address) on the optical disc 41, the time code at the recording start point, and the time code at the recording end point from the clip information memory 20. The disc write unit 48 reads the recording start position information, the time code at the recording start point, and the time code at the recording end point from the clip information memory 20. The disc write unit 48 adds ECC to the recording start position information and the time codes, and modulates the recording start position information and the time codes. The recording start position information, the time code at the recording start point, and the time code at the recording end point are combined to form clip information. Then, the drive control unit 47 records the clip information read from the clip information memory 20, provided with ECC, and modulated by the disc write unit 48 from the optical head 42 onto the optical disc 41. Incidentally, clip information for all cuts is recorded together at a predetermined recording position on the optical disc 41.

At a step S223 after the processing of the step S222, the control unit 12 ends the data compression processing by the data compressing unit 15. At a step S224 after the processing of the step S223, the control unit 12 ends the processing of adding a time code to compressed data by the time code adding unit 17.

At a step S225 after the processing of the step S224, the control unit 12 determines whether the camera standby mode is cancelled on the basis of operation information from the operating unit 11. When the camera standby mode is not cancelled, the processing returns to the step S205 in FIG. 12 to repeat the processing from the step S205 on down. When the control unit 12 determines at the step S225 that the camera standby mode is cancelled, the recording processing is ended.

This concludes the description of the recording processing of the recording and reproducing apparatus 1 in FIG. 11. Incidentally, in a case where an instruction to resume recording is inputted at the step S218 after an instruction to pause is inputted at the step S213 and a time code at a recording end point (this time code will be referred to as a time code TC1) is stored in the play list memory 19 at the step S214, a new time code is thereafter stored so as to overwrite the time code TC1 at the step S214 after an instruction to pause is inputted again at the step S213.

Also, in a case where an instruction to resume recording is inputted at the step S218 after an instruction to pause is inputted at the step S213 and a time code at a recording end point (this time code will be referred to as a time code TC1) is stored in the clip information memory 20 at the step S215, a new time code is thereafter stored so as to overwrite the time code TC1 at the step S215 after an instruction to pause is inputted again at the step S213.

Figure 15:
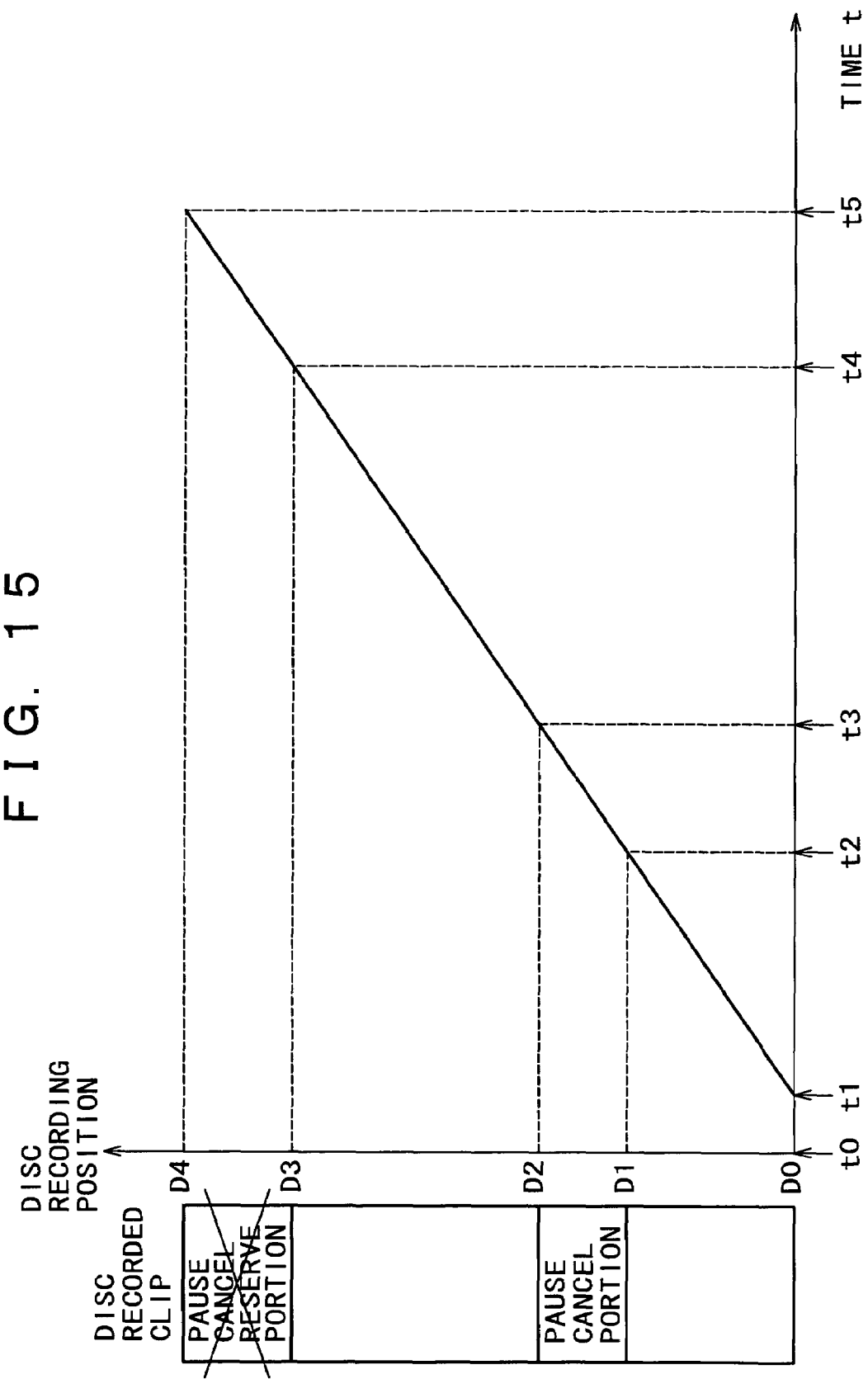
FIG. 15 is a diagram of assistance in explaining recording positions of AV data on an optical disc.

FIG. 15 shows a relation between recording position on the optical disc 41 and time t in the recording processing of the recording and reproducing apparatus 1 in FIG. 11.

In FIG. 15, the axis of abscissas indicates time t, and the axis of ordinates indicates recording position on the optical disc 41. A time t0 represents a time at which the image pickup unit 13 starts image pickup at the step S204. A time t1 represents a time at which the drive 21 starts recording compressed data (AV data) onto the optical disc 41 at the step S212. A time t2 represents a time at which an instruction to pause is inputted at the step S213. A time t3 represents a time at which an instruction to resume recording is inputted at the step S218. As with the time t2, a time t4 represents a time at which an instruction to pause is inputted at the step S213. A time t5 represents a time at which the drive 21 ends the recording of compressed data (AV data) at the step S219.

In a period from the time t2 to the time t3, the recording position on the optical disc 41 is shifted from D1 to D2. This indicates that unlike the recording and reproducing apparatus 1 in FIG. 1, the recording and reproducing apparatus 1 in FIG. 11 continues recording compressed data (AV data) onto the optical disc 41 even after the input of the pause instruction.

A cross is marked on data recorded between recording positions D3 and D4 on the optical disc 41 in FIG. 15. This denotes compressed data (AV data) after the pause time which data is erased at the step S220.

Processing for reproducing compressed data (AV data) recorded by the recording and reproducing apparatus 1 in FIG. 11 is basically the same as in the case of the recording and reproducing apparatus 1 in FIG. 1.

As described above, when the user inputs an instruction to resume recording within a predetermined time after the user inputs an instruction to pause recording during recording of video (audio) (or before a data amount of data stored in the buffer memory 18 reaches a predetermined data amount after the input of the pause instruction), the recording and reproducing apparatus 1 according to the present invention records video (audio) during the pause period onto a recording medium. Thereby, when a scene occurs which the user desires to take during the pause period, the recording and reproducing apparatus 1 according to the present invention can record the scene onto the recording medium.

It is to be noted that the present invention is applicable to recording media other than the optical disc 41. The present invention is applicable to for example magnetic discs, semiconductor memories, hard discs, recording media in tape form or the like in place of optical discs (however, the example of FIG. 11 is not applicable to recording media in tape form). Further, the present invention is applicable to removable media (recording media) and fixed recording media (recording devices).

Also, while the above description has been made by taking as an example a case where both video data and audio data are recorded on the optical disc 41, the present invention is applicable to the recording of only video data or only audio data.

Also, while the above description has been made by taking as an example a case where the recording of compressed data onto the optical disc 41 is "paused" and thereafter the recording is resumed, the present invention is applicable to a case where the recording of compressed data onto the optical disc 41 is "stopped" and thereafter the recording is resumed.

Further, while the above description illustrates a case where the present invention is applied to a combination camera and video recording apparatus, the present invention is of course applicable to apparatus other than the combination camera and video recording apparatus. The present invention is for example applicable to recording apparatus completely separated from a camera, apparatus having a camera and a recording apparatus detachable from each other, recording and reproducing apparatus and the like.

Further, while the above description has been made by taking as an example a case where recording processing and reproduction processing are performed by the same apparatus, a recording apparatus for performing the recording processing and a reproducing apparatus for performing the reproduction processing can be apparatus separate from each other, of course.

In addition, while in the above description, video data, audio data, and time code are recorded as a set in each frame as shown in FIG. 6, the present invention is applicable to a case where video data, audio data, and time code are recorded as respective files different from each other. Also, the time code may be any time information as long as the time information indicates the time of content data.

In addition, while the processing of the step S2, the step S3, the step S6, and the step S7 in FIG. 2 and the processing of the step S202, the step S203, the step S206, and the step S207 in FIG. 12 as described above are the processing of time code setting, that is, initializing the time code on the basis of the setting of the REC run mode and the free run mode, the present invention is applicable to a case where such time code setting is not performed. In a case where the present invention is applied to an apparatus that initializes the time code when the camera standby mode is set, for example, the processing of the step S2, the step S6, and the step S7 in FIG. 2 (the processing of the step S202, the step S206, and the step S207 in FIG. 12) is omitted. In a case where the present invention is applied to an apparatus that initializes the time code when an instruction for recording is inputted, for example, the processing of the step S2, the step S3, and the step S6 in FIG. 2 (the processing of the step S202, the step S203, and the step S206 in FIG. 12) is omitted. Of course, the present invention is applicable to apparatus other than the above-mentioned examples.

The series of processes described above can be implemented not only by hardware but also by software. When the series of processes is to be implemented by software, a program forming the software is installed in a computer, and the computer executes the program, thereby functionally implementing the recording and reproducing apparatus 1 described above.

Figure 16:
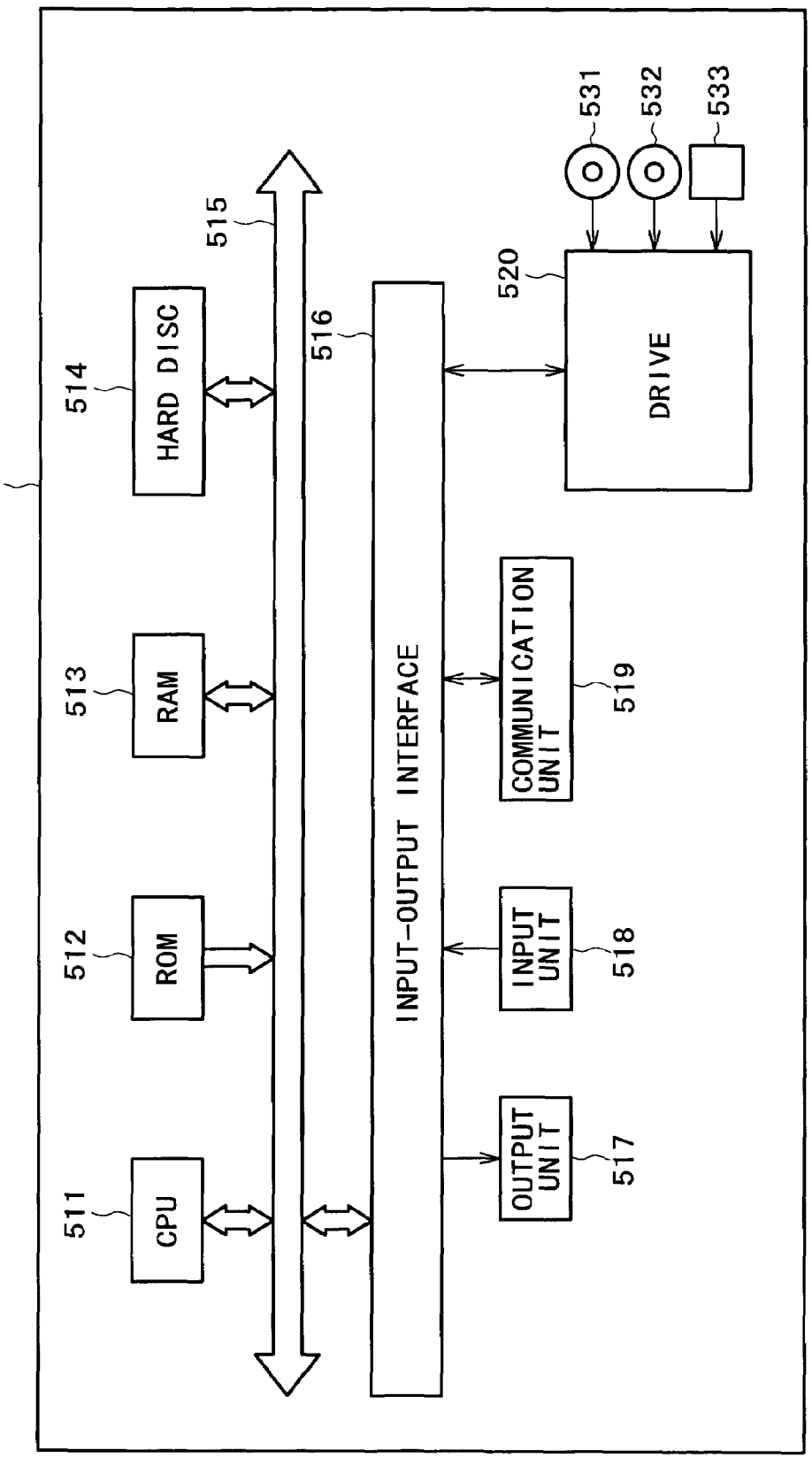
FIG. 16 is a block diagram showing an example of configuration of a personal computer 501.

FIG. 16 is a block diagram showing a configuration of an embodiment of a computer 501 that functions as a disc recording and reproducing apparatus 1 as described above. A CPU (Central Processing Unit) 511 is connected with an input-output interface 516 via a bus 515. When a user inputs an instruction from an input unit 518 comprising a keyboard, a mouse and the like via the input-output interface 516, the CPU 511 loads into a RAM (Random Access Memory) 513 a program stored in for example a ROM (Read Only Memory) 512, a hard disc 514, or a recording medium such as a magnetic disc 531, an optical disc 532, a semiconductor memory 533 or the like inserted in a drive 520, and then executes the program. Thereby the various processes described above are performed.

Further, the CPU 511 outputs a result of the processing to an output unit 517 formed by an LCD or the like via the input-output interface 516 as required, for example. Incidentally, the program can be stored in advance in the hard disc 514 or the ROM 512 and provided to a user integrally with the computer 501, provided as a packaged medium such as the magnetic disc 531, the optical disc 532, the semiconductor memory 533 or the like, or provided from a satellite, a network or the like through a communication unit 519 to the hard disc 514.

It is to be noted that in the present specification, the steps describing the program provided by a recording medium (program storing medium) include not only processing carried out in time series in the described order but also processing carried out in parallel or individually and not necessarily in time series. Also, in the present specification, a system refers to an apparatus as a whole formed by a plurality of apparatus.

While the preferred embodiments of the present invention have been described using the specific terms, such description is for illustrative purposes only, and it is to be understood that changes and variations may be made without departing from the spirit or scope of the following claims.

What is claimed is:

1. A data processing apparatus comprising:
    a recorder for recording content data onto a recording medium;
    a controller for controlling said recorder such that when, after first timing in which user instruction information indicating a first instruction to pause or stop recording of said content data is received from a user during recording of said content data onto said recording medium, user instruction information indicating a second instruction to resume recording said content data is received in third timing before second timing that is timing a preset period after said first timing,
    said content data corresponding to a period from said first timing to said third timing is recorded on said recording medium so as to be continuous with said content data before said first timing;
    a memory for temporarily storing said content data inputted to the memory,
    wherein said controller controls said recorder to sequentially record said content data stored in said memory onto said recording medium;
    said controller controls said recorder such that when user instruction information indicating said second instruction is received within a period from said first timing during the recording of said content data onto said recording medium to said second timing, said content data corresponding to the period from said first timing to said third timing is read from said memory after said third timing and recorded on said recording medium; and said controller controls said recorder such that when no user instruction information indicating said second instruction is received within the period from said first timing during the recording of said content data onto said recording medium to said second timing, said content data corresponding to the period from said first timing to said second timing is not recorded on said recording medium.

2. The data processing apparatus as claimed in claim 1, wherein said second timing is a time when a data amount of said content data stored in said memory after said first timing reaches a threshold value.

3. A data processing apparatus as claimed in claim 1,
wherein said controller controls said recorder to sequentially record said content data onto said recording medium;
said controller controls said recorder such that when user instruction information indicating said second instruction is received within a period from said first timing during the recording of said content data onto said recording medium to said second timing, said content data corresponding to the period from said first timing to said third timing is retained on said recording medium; and
said controller controls said recorder such that when no user instruction information indicating said second instruction is received within the period from said first timing during the recording of said content data onto said recording medium to said second timing, said content data corresponding to a period from said first timing to said second timing is erased from said recording medium.

4. A data processing apparatus as claimed in claim 3, wherein said controller controls said recorder such that when no user instruction information indicating said second instruction is received within the period from said first timing to said second timing, said content data itself corresponding to the period from said first timing to said second timing is erased from said recording medium.

5. A data processing apparatus as claimed in claim 3, wherein when no user instruction information indicating said second instruction is received within the period from said first timing to said second timing, said controller treats said content data corresponding to the period from said first timing to said second timing as erased from said recording medium by excluding said content data corresponding to the period from said first timing to said second timing from a play list used for reproduction of said content data recorded on said recording medium so that said content data corresponding to the period from said first timing to said second timing is erased from said recording medium.

6. A data processing apparatus as claimed in claim 1, further comprising
a generator for generating time information,
wherein said controller records said time information in association with said content data onto said recording medium by said recorder.

7. A data processing apparatus as claimed in claim 1, further comprising an image pickup device for obtaining said content data.

8. A data processing method comprising the steps of:
recording content data onto a recording medium by a recorder;

controlling said recorder such that when, after first timing in which user instruction information indicating a first instruction to pause or stop recording of said content data is received from a user during processing of said recording step, user instruction information indicating a second instruction to resume recording said content data is received in third timing before second timing that is timing a preset period after said first timing, said content data corresponding to a period from said first timing to said third timing is recorded on said recording medium so as to be continuous with said content data before said first timing;

a step for temporarily storing said content data inputted to a memory in the memory,
wherein in the processing of said recording step, said content data stored by processing of said storing step is sequentially recorded onto said recording medium; and
in processing of said controlling step, when user instruction information indicating said second instruction is received within a period from said first timing during recording of said content data onto said recording medium to said second timing, said content data corresponding to the period from said first timing to said third timing is read from said memory after said third timing and recorded on said recording medium, and
when no user instruction information indicating said second instruction is received within the period from said first timing to said second timing, said content data corresponding to the period from said first timing to said second timing is not recorded on said recording medium.

9. The data processing method as claimed in claim 8,
wherein said second timing is a time when a data amount of said content data stored in said memory after said first timing reaches a threshold value.

10. A data processing method as claimed in claim 8,
wherein in the processing of said recording step, said content data is sequentially recorded onto said recording medium; and
in processing of said controlling step, when user instruction information indicating said second instruction is received within a period from said first timing during recording of said content data onto said recording medium to said second timing, said content data corresponding to the period from said first timing to said third timing is retained on said recording medium, and when no user instruction information indicating said second instruction is received within the period from said first timing to said second timing, said content data corresponding to the period from said first timing to said second timing is erased from said recording medium.

11. A data processing method as claimed in claim 10,
wherein in the processing of said controlling step,
when no user instruction information indicating said second instruction is received within the period from said first timing to said second timing, said content data itself corresponding to the period from said first timing to said second timing is erased from said recording medium.

12. A data processing method as claimed in claim 10, wherein in the processing of said controlling step,
when no user instruction information indicating said second instruction is received within the period from said first timing to said second timing, said content data corresponding to the period from said first timing to said second timing is treated as erased from said recording medium by excluding said content data corresponding to the period from said first timing to said second timing from a play list used for reproduction of said content data recorded on said recording medium so that said content data corresponding to the period from said first timing to said second timing is erased from said recording medium.

13. A data processing method as claimed in claim 8, further comprising:
   a step for generating time information,
   wherein in the processing of said recording step, said time information is recorded in association with said content data onto said recording medium.

14. A data processing method as claimed in claim 8, further comprising a step for obtaining said content data.

15. A computer-readable medium storing a program that when executed causes a computer to carry out a data processing method, said data processing method comprising the steps of:
   recording content data onto a recording medium by a recorder;
   controlling said recorder such that when, after first timing in which user instruction information indicating a first instruction to pause or stop recording of said content data is received from a user during processing of said recording step, user instruction information indicating a second instruction to resume recording said content data is received in third timing before second timing that is timing a preset period after said first timing, said content data corresponding to a period from said first timing to said third timing is recorded on said recording medium so as to be continuous with said content data before said first timing;
   a step for temporarily storing said content data inputted to a memory in the memory,
   wherein in the processing of said recording step, said content data stored by processing of said storing step is sequentially recorded onto said recording medium; and
   in processing of said controlling step, when user instruction information indicating said second instruction is received within a period from said first timing during recording of said content data onto said recording medium to said second timing, said content data corresponding to the period from said first timing to said third timing is read from said memory after said third timing and recorded on said recording medium, and
   when no user instruction information indicating said second instruction is received within the period from said first timing to said second timing, said content data corresponding to the period from said first timing to said second timing is not recorded on said recording medium.

\* \* \* \* \*